United States Patent
Wu et al.

(10) Patent No.: US 12,557,122 B2
(45) Date of Patent: Feb. 17, 2026

(54) SUPERPOSITION TRANSMISSION TECHNIQUES IN SIDELINK COMMUNICATIONS

(71) Applicant: QUALCOMM INCORPORATED, San Diego, CA (US)

(72) Inventors: Shuanshuan Wu, San Diego, CA (US); Kapil Gulati, Belle Mead, NJ (US); Anantharaman Balasubramanian, San Diego, CA (US); Stelios Stefanatos, San Diego, CA (US); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 18/546,571

(22) PCT Filed: Mar. 31, 2022

(86) PCT No.: PCT/US2022/022833
§ 371 (c)(1),
(2) Date: Aug. 15, 2023

(87) PCT Pub. No.: WO2022/225667
PCT Pub. Date: Oct. 27, 2022

(65) Prior Publication Data
US 2024/0147502 A1    May 2, 2024

(30) Foreign Application Priority Data

Apr. 19, 2021    (GR) ............................... 20210100276

(51) Int. Cl.
*H04W 72/25*    (2023.01)
*H04L 5/00*    (2006.01)

(52) U.S. Cl.
CPC .......... *H04W 72/25* (2023.01); *H04L 5/0094* (2013.01)

(58) Field of Classification Search
USPC .... 370/229, 230, 230.1, 236, 252, 328, 329, 370/330
See application file for complete search history.

(56) References Cited

U.S. PATENT DOCUMENTS

2016/0234282 A1\* 8/2016 Lederer .................. H04L 65/65
2018/0091959 A1\* 3/2018 Sun ..................... H04W 52/262
(Continued)

FOREIGN PATENT DOCUMENTS

WO    WO-2019098403 A1    5/2019

OTHER PUBLICATIONS

International Search Report and Written Opinion—PCT/US2022/022833—ISA/EPO—Jul. 8, 2022 (2103090WO).

*Primary Examiner* — Nguyen H Ngo
(74) *Attorney, Agent, or Firm* — Holland & Hart LLP

(57) ABSTRACT

Methods, systems, and devices for wireless communications are described in which multiuser superposition transmission (MUST) is used to provide multiple concurrent sidelink transmissions using a same set of time and frequency resources. A transmitting user equipment (UE) may provide an indication of concurrent MUST transmissions in sidelink control information (SCI), and a receiving UE may decode one or both of a MUST base layer communication and a MUST enhancement layer communication. The base layer communication may include broadcast or groupcast transmissions to multiple UEs, and the enhancement layer communication may include a unicast transmission between the transmitting UE and a single receiving UE. The indication of concurrent transmissions may be provided in a first stage SCI, and parameters for decoding the base layer and (Continued)

enhancement layer transmissions may be provided in one or multiple second stage SCI transmissions.

30 Claims, 15 Drawing Sheets

(56) References Cited

U.S. PATENT DOCUMENTS

| | | |
|---|---|---|
| 2020/0389870 A1* | 12/2020 | Shin .................... H04W 48/08 |
| 2021/0083704 A1 | 3/2021 | Liao et al. |
| 2021/0184909 A1 | 6/2021 | Han et al. |
| 2022/0061030 A1 | 2/2022 | Wu et al. |
| 2023/0354334 A1* | 11/2023 | Chen .................... H04W 72/543 |
| 2023/0413121 A1* | 12/2023 | Chen .................... H04L 5/0044 |

* cited by examiner

SUPERPOSITION TRANSMISSION TECHNIQUES IN SIDELINK COMMUNICATIONS

CROSS REFERENCE

The present application is a 371 national stage filing of International PCT Application No. PCT/US2022/022833 by W U et al. entitled "SUPERPOSITION TRANSMISSION TECHNIQUES IN SIDELINK COMMUNICATIONS," filed Mar. 31, 2022; and claims priority to Greek Patent Application No. 20210100276 by W U et al. entitled "SUPERPOSITION TRANSMISSION TECHNIQUES IN SIDELINK COMMUNICATIONS," filed Apr. 19, 2021, each of which is assigned to the assignee hereof, and each of which is expressly incorporated by reference in its entirety herein.

FIELD OF TECHNOLOGY

The following relates to wireless communications, including superposition transmission techniques in sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station over uplink and downlink communication channels, and in some cases may also communicate with neighboring UEs over a sidelink communications channel (e.g., which may be referred to as PC5 or sidelink communications). Sidelink communications may enhance efficiency of UE-to-UE communications by allowing direct communications between devices rather than communications via a base station. Techniques to enhance the efficiency of sidelink communications are desirable.

SUMMARY

The described techniques relate to improved methods, systems, devices, and apparatuses that support superposition transmission techniques in sidelink communications. Various described techniques provide for multiuser superposition transmission (MUST) in sidelink communications that allow for concurrent transmissions from a transmitting UE to multiple receiving UEs. In some cases, a transmitting UE may provide an indication of concurrent MUST transmissions in sidelink control information (SCI), and a UE that is capable of decoding concurrent MUST transmissions may decode one or both of a MUST base layer communication and a MUST enhancement layer communication. In some cases, the base layer communication may include broadcast or groupcast transmissions to multiple UEs, and the enhancement layer communication may include a unicast transmission between the transmitting UE and a single receiving UE. In some cases, the indication of concurrent transmissions may be provided in a first stage SCI (e.g., SCI-1), and parameters for decoding the base layer and enhancement layer transmissions may be provided in one or multiple second stage SCI (e.g., SCI-2) transmissions.

A method for wireless communications at a first user equipment (UE) is described. The method may include receiving, from a transmitting UE, an indication that superposition coding is used to concurrently transmit a sidelink base layer transmission and a sidelink enhancement layer transmission in a sidelink communication from the transmitting UE, receiving, based on the indication, one or more stage-two sidelink control information transmissions that provide one or more parameters for one or more of the sidelink base layer transmission or the sidelink enhancement layer transmission, and decoding, based on the one or more parameters, one or more of the sidelink base layer transmission or the sidelink enhancement layer transmission.

An apparatus for wireless communications at a first UE is described. The apparatus may include a processor, memory coupled with the processor, and instructions stored in the memory. The instructions may be executable by the processor to cause the apparatus to receive, from a transmitting UE, an indication that superposition coding is used to concurrently transmit a sidelink base layer transmission and a sidelink enhancement layer transmission in a sidelink communication from the transmitting UE, receive, based on the indication, one or more stage-two sidelink control information transmissions that provide one or more parameters for one or more of the sidelink base layer transmission or the sidelink enhancement layer transmission, and decoding, base at least in part on the one or more parameters, one or more of the sidelink base layer transmission or the sidelink enhancement layer transmission.

Another apparatus for wireless communications at a first UE is described. The apparatus may include means for receiving, from a transmitting UE, an indication that superposition coding is used to concurrently transmit a sidelink base layer transmission and a sidelink enhancement layer transmission in a sidelink communication from the transmitting UE, means for receiving, based on the indication, one or more stage-two sidelink control information transmissions that provide one or more parameters for one or more of the sidelink base layer transmission or the sidelink enhancement layer transmission, and means for decoding, based on the one or more parameters, one or more of the sidelink base layer transmission or the sidelink enhancement layer transmission.

A non-transitory computer-readable medium storing code for wireless communications at a first UE is described. The code may include instructions executable by a processor to receive, from a transmitting UE, an indication that superposition coding is used to concurrently transmit a sidelink base layer transmission and a sidelink enhancement layer transmission in a sidelink communication from the transmitting UE, receive, based on the indication, one or more stage-two sidelink control information transmissions that provide one or more parameters for one or more of the sidelink base layer transmission or the sidelink enhancement layer transmission, and decoding, base at least in part on the one or more parameters, one or more of the sidelink base layer transmission or the sidelink enhancement layer transmission.

In some examples of the method, apparatuses, and non-transitory computer-readable medium described herein, the indication that superposition coding is used to concurrently transmit the sidelink base layer transmission and the sidelink enhancement layer transmission is received in a stage-one sidelink control information transmission. In some examples of the method, apparatuses, and non-transitory computer-readable medium described herein, the decoding may include operations, features, means, or instructions for decoding both the sidelink base layer transmission and the sidelink enhancement layer transmission. In some examples of the method, apparatuses, and non-transitory computer-readable medium described herein, the sidelink base layer transmission includes broadcast or groupcast information that is transmitted multiple receiving UEs, and the sidelink enhancement layer transmission includes unicast information that is transmitted to the first UE from the transmitting UE.

In some examples of the method, apparatuses, and non-transitory computer-readable medium described herein, the receiving the one or more stage-two sidelink control information transmissions may include operations, features, means, or instructions for receiving, based on a stage-one sidelink control information transmission, a first stage-two sidelink control information transmission that provides a first set of parameters for the sidelink base layer transmission and receiving, based on the indication in the stage-one sidelink control information transmission, a second stage-two sidelink control information transmission that provides a second set of parameters for the sidelink enhancement layer transmission. In some examples of the method, apparatuses, and non-transitory computer-readable medium described herein, the decoding may include operations, features, means, or instructions for decoding the sidelink base layer transmission based on the first set of parameters in the first stage-two sidelink control information transmission and decoding the sidelink enhancement layer transmission based on the second set of parameters in the second stage-two sidelink control information transmission. In some examples of the method, apparatuses, and non-transitory computer-readable medium described herein, the second stage-two sidelink control information transmission is transmitted as a medium access control (MAC) control element (CE) associated with a transport block that is decoded based on the first stage-two sidelink control information transmission. In some examples of the method, apparatuses, and non-transitory computer-readable medium described herein, the first stage-two sidelink control information transmission may have a first format, and the second stage-two sidelink control information transmission may have a second format that is different than the first format.

In some examples of the method, apparatuses, and non-transitory computer-readable medium described herein, a stage-one sidelink control information transmission includes one or more bits that indicate that superposition coding is being used to concurrently transmit the sidelink base layer transmission and the sidelink enhancement layer transmission in the sidelink communication from the transmitting UE. In some examples of the method, apparatuses, and non-transitory computer-readable medium described herein, the one or more stage-two sidelink control information transmissions include a first stage-two sidelink control information transmission and a second stage-two sidelink control information transmission that is concurrently transmitted in a same set of sidelink control information resources using superposition coding. In some examples of the method, apparatuses, and non-transitory computer-readable medium described herein, the one or more stage-two sidelink control information transmissions include a single stage-two sidelink control information transmission that provides both a first set of parameters for the sidelink base layer transmission and a second set of parameters for the sidelink enhancement layer transmission.

Some examples of the method, apparatuses, and non-transitory computer-readable medium described herein may further include operations, features, means, or instructions for receiving, from the transmitting UE or from a serving base station, configuration information that enables superposition coding to be used for concurrent transmissions of the sidelink base layer transmission and the sidelink enhancement layer transmission. Some examples of the method, apparatuses, and non-transitory computer-readable medium described herein may further include operations, features, means, or instructions for transmitting, to the transmitting UE or to the serving base station, a capability indication that indicates that the first UE has a capability for decoding concurrent transmissions of the sidelink base layer transmission and the sidelink enhancement layer transmission.

A method for wireless communications at a transmitting UE is described. The method may include transmitting, to one or more receiving UEs, an indication that superposition coding is used to concurrently transmit a sidelink base layer transmission and a sidelink enhancement layer transmission in a sidelink communication from the transmitting UE, transmitting, to the one or more receiving UEs, one or more stage-two sidelink control information transmissions that provide one or more parameters for one or more of the sidelink base layer transmission or the sidelink enhancement layer transmission, encoding, based on the one or more parameters, the sidelink base layer transmission and the sidelink enhancement layer transmission into the sidelink communication, and transmitting the sidelink communication to the one or more receiving UEs.

An apparatus for wireless communications at a transmitting UE is described. The apparatus may include a processor, memory coupled with the processor, and instructions stored in the memory. The instructions may be executable by the processor to cause the apparatus to transmit, to one or more receiving UEs, an indication that superposition coding is used to concurrently transmit a sidelink base layer transmission and a sidelink enhancement layer transmission in a sidelink communication from the transmitting UE, transmit, to the one or more receiving UEs, one or more stage-two sidelink control information transmissions that provide one or more parameters for one or more of the sidelink base layer transmission or the sidelink enhancement layer transmission, encode, based on the one or more parameters, the sidelink base layer transmission and the sidelink enhancement layer transmission into the sidelink communication, and transmit the sidelink communication to the one or more receiving UEs.

Another apparatus for wireless communications at a transmitting UE is described. The apparatus may include means for transmitting, to one or more receiving UEs, an indication that superposition coding is used to concurrently transmit a sidelink base layer transmission and a sidelink enhancement layer transmission in a sidelink communication from the transmitting UE, means for transmitting, to the one or more receiving UEs, one or more stage-two sidelink control information transmissions that provide one or more parameters for one or more of the sidelink base layer transmission or the sidelink enhancement layer transmission, means for encoding, based on the one or more parameters, the sidelink base layer transmission and the sidelink enhancement layer transmission into the sidelink communication, and means for transmitting the sidelink communication to the one or more receiving UEs.

A non-transitory computer-readable medium storing code for wireless communications at a transmitting UE is described. The code may include instructions executable by a processor to transmit, to one or more receiving UEs, an indication that superposition coding is used to concurrently transmit a sidelink base layer transmission and a sidelink enhancement layer transmission in a sidelink communication from the transmitting UE, transmit, to the one or more receiving UEs, one or more stage-two sidelink control information transmissions that provide one or more parameters for one or more of the sidelink base layer transmission or the sidelink enhancement layer transmission, encode, based on the one or more parameters, the sidelink base layer transmission and the sidelink enhancement layer transmission into the sidelink communication, and transmit the sidelink communication to the one or more receiving UEs.

In some examples of the method, apparatuses, and non-transitory computer-readable medium described herein, the indication that superposition coding is used to concurrently transmit the sidelink base layer transmission and the sidelink enhancement layer transmission is transmitted in a stage-one sidelink control information transmission. In some examples of the method, apparatuses, and non-transitory computer-readable medium described herein, both the sidelink base layer transmission and the sidelink enhancement layer transmission is transmitted to a first UE for decoding at the first UE. In some examples of the method, apparatuses, and non-transitory computer-readable medium described herein, the sidelink base layer transmission includes broadcast or groupcast information that is transmitted to multiple receiving UEs, and the sidelink enhancement layer transmission includes unicast information that is transmitted to only the first UE.

In some examples of the method, apparatuses, and non-transitory computer-readable medium described herein, the transmitting the one or more stage-two sidelink control information transmissions may include operations, features, means, or instructions for transmitting a first stage-two sidelink control information transmission that provides a first set of parameters for the sidelink base layer transmission and transmitting a second stage-two sidelink control information transmission that provides a second set of parameters for the sidelink enhancement layer transmission. In some examples of the method, apparatuses, and non-transitory computer-readable medium described herein, the second stage-two sidelink control information transmission is transmitted as a medium access control (MAC) control element (CE) associated with a first transport block of the sidelink base layer transmission, that is decoded based on the first stage-two sidelink control information transmission.

In some examples of the method, apparatuses, and non-transitory computer-readable medium described herein, a stage-one sidelink control information transmission includes one or more bits that indicate that superposition coding is being used to concurrently transmit the sidelink base layer transmission and the sidelink enhancement layer transmission in the sidelink communication from the transmitting UE. In some examples of the method, apparatuses, and non-transitory computer-readable medium described herein, the one or more stage-two sidelink control information transmissions include a first stage-two sidelink control information transmission and a second stage-two sidelink control information transmission that is concurrently transmitted in a same set of sidelink control information resources using superposition coding. In some examples of the method, apparatuses, and non-transitory computer-readable medium described herein, the one or more stage-two sidelink control information transmissions include a single stage-two sidelink control information transmission that provides both a first set of parameters for the sidelink base layer transmission and a second set of parameters for the sidelink enhancement layer transmission.

Some examples of the method, apparatuses, and non-transitory computer-readable medium described herein may further include operations, features, means, or instructions for transmitting configuration information that enables superposition coding to be used for concurrent transmissions of the sidelink base layer transmission and the sidelink enhancement layer transmission. Some examples of the method, apparatuses, and non-transitory computer-readable medium described herein may further include operations, features, means, or instructions for receiving, from one or more UEs, a capability indication that indicates that a capability for decoding concurrent transmissions of the sidelink base layer transmission and the sidelink enhancement layer transmission.

DETAILED DESCRIPTION

Figure 1:
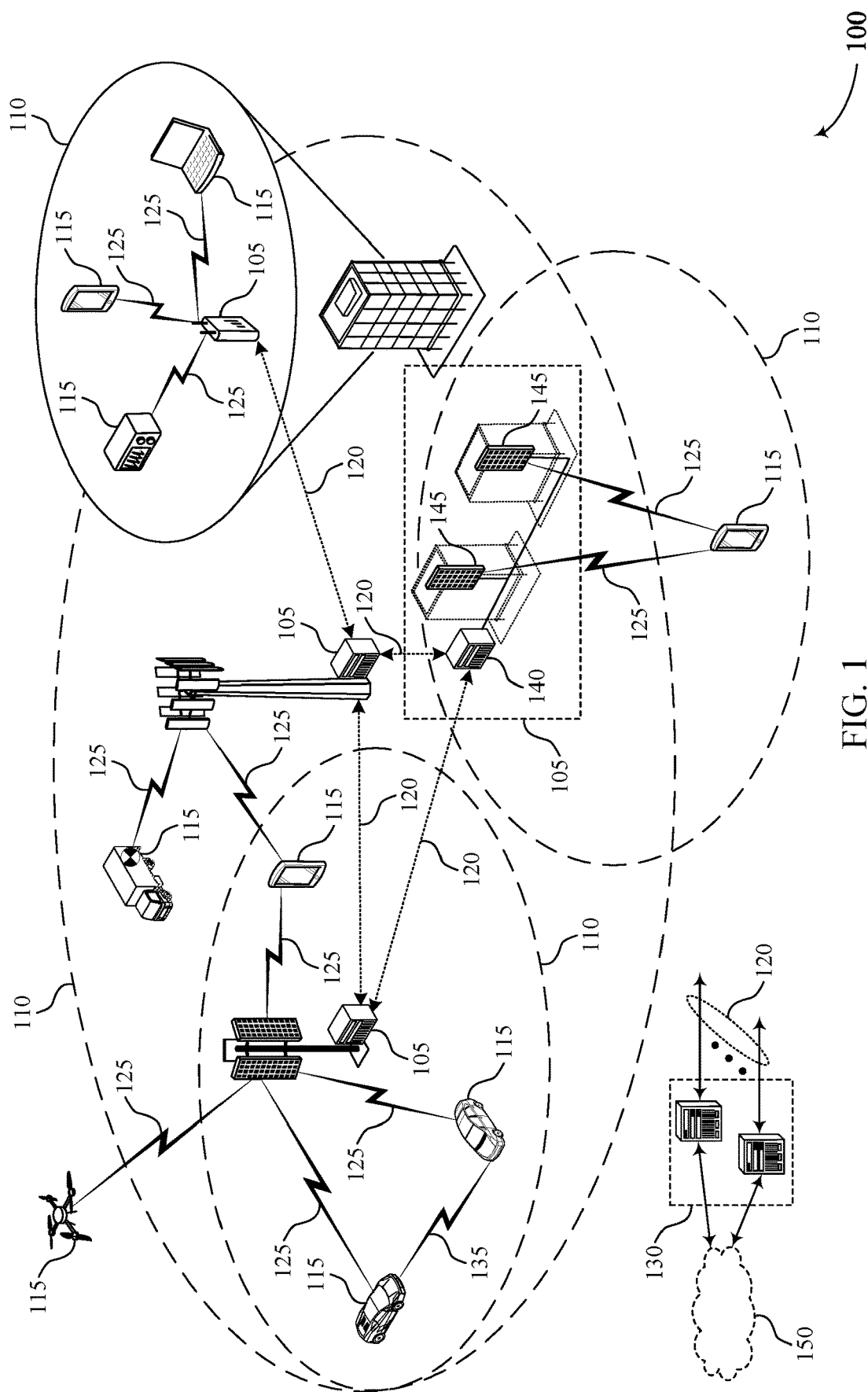
FIG. 1 illustrates an example of a wireless communications system that supports superposition transmission techniques in sidelink communications in accordance with aspects of the present disclosure.

A user equipment (UE) may communicate with a base station over uplink channels and may also communicate with neighboring UEs over a sidelink communications channel. A UE communicating over a sidelink channel to other neighboring UEs may be, in an example, a vehicle in a vehicle to vehicle (V2V) or a vehicle to everything (V2X) wireless communication system. In some cases, separate resources may be assigned for sidelink transmissions between UEs, such as in conventional Mode-1 or Mode-2 V2X systems. In accordance with various aspects described herein, in order to efficiently utilize available time and frequency resources, a UE may transmit multiple concurrent sidelink communications using a same set of sidelink resources. The multiple concurrent sidelink communications may be transmitted using multiuser superposition transmission (MUST) techniques in which a first transmission may be in a base layer and a second transmission may be in an enhancement layer. For example, a transmitting sidelink UE may encode a first data transmission (e.g., a first transport block (TB)) to be transmitted as a base layer transmission, and may encode a second data transmission (e.g., a second TB) to be transmitted in as enhancement layer. The base layer and the enhancement layer may be superimposed in a concurrent transmission such that the transmitting UE may transmit the base layer and the enhancement layer concurrently using a same set of sidelink resources.

In some cases, the base layer in a MUST transmission may be encoded based on a weaker communication link (e.g., based on a channel with a lower signal to noise ratio (SNR)) and may include unicast data to a particular UE or may include broadcast or groupcast data that is transmitted to multiple UEs. In some cases, the enhancement layer may be encoded based on a stronger communication link (e.g., based on the channel with a higher SNR) and may include unicast data to a particular UE. In some cases, broadcast or groupcast data transmitted on the base layer, and unicast data transmitted on the enhancement layer, may both be received at a same receiving UE. Thus, the transmitting UE may transmit a concurrent transmission within a same resource that includes the base layer and the enhancement layer, which may lead to a higher spectral efficiency.

In some cases, a UE simultaneously transmitting multiple concurrent sidelink communications may indicate that concurrent sidelink communications are being transmitted via sidelink control information (SCI). In some cases, a UE that is capable of decoding concurrent MUST transmissions may decode one or both of the base layer communication and enhancement layer communication. In some cases, the base layer communication may include broadcast or groupcast transmissions to multiple UEs, and the enhancement layer communication may include a unicast transmission between the transmitting UE and a single receiving UE (e.g., a first receiving UE). In some cases, the indication of concurrent transmissions may be provided in a first stage SCI (e.g., SCI-1), and parameters for decoding the base layer and enhancement layer transmissions may be provided in one or multiple second stage SCI (e.g., SCI-2) transmissions.

Because the transmitting UE indicates to the first receiving UE that concurrent sidelink communications are being transmitted, the first receiving UE may monitor the sidelink resources for one or both of the indicated base layer and indicated enhancement layer sidelink communications. The transmitting UE may also provide one or more transmission parameters that may be used by receiving UEs to decode the concurrent communications. The parameters may include an indication of a modulation and coding scheme (MCS) used to generate each sidelink transmission, a power split parameter (e.g., $\alpha$) indicating a power split between the base layer and enhancement layer transmissions of the concurrent sidelink communications, and an indication that the channel is coded for MUST, or any combination thereof.

MUST techniques may be used for sidelink communications in some aspects to provide for enhanced capacity for sidelink resources, which may result in less congestion in sidelink communications, enhance reliability, and provide for lower latency. In some cases, a MUST base layer may include broadcast or groupcast communications that are intended for multiple UEs. Groupcast communications may include sidelink transmissions intended for a group of UEs (e.g., a number of UEs may form a group based on upper layer signaling procedures, based on geographical distance, etc.). Broadcast communications may include sidelink transmissions that are intended for any UEs monitoring sidelink transmissions. By providing broadcast or groupcast communications on the base layer, these communications may be more likely to be received at the multiple UEs which may have varying different channel conditions (e.g., including channel conditions that would not support reliable decoding of enhancement layer transmission). Further, unicast communications may be transmitted on the enhancement layer to a particular receiving UE. In some cases, the particular receiving UE may be selected based on having channel conditions and a capability that support decoding MUST encoded transmissions.

In some cases, a sidelink data channel transmissions (e.g., PSSCH) have associated control channel (e.g., physical sidelink control channel (PSCCH)). The PSCCH may carries first stage sidelink control information (SCI-1), which indicates one or more parameters, such as resource allocation, MCS, and the like. The PSSCH resource also carries second stage control (SCI-2), which indicates cast types (e.g., unicast, broadcast, groupcast), source and destination IDs, and the like. In various aspects, an indication of MUST transmissions may be provided in SCI-1, SCI-2, or any combinations thereof. For example, SCI-1 may include an indication that MUST encoding is used for a sidelink communication, a first SCI-2 may provide one or more parameters for a base layer transmission of the sidelink communications, and a second SCI-2 may provide one or more parameters for an enhancement layer transmission of the sidelink communications. A UE that is capable of receiving a MUST enhancement layer transmission may determine decoding parameters for the base layer and enhancement layer, and decode one or both transmissions. Such techniques may provide for more optimal utilization of resources relative to cases where a transmitting UE would use different time and/or frequency resources to transmit different cast types or to different receiver UEs. Thus, spectral efficiency may be improved, providing for enhanced throughput, enhanced reliability, and reduced latency, among other benefits.

Aspects of the disclosure are initially described in the context of wireless communications systems, MUST transmission techniques, and sidelink resources. Aspects of the disclosure are further illustrated by and described with reference to a process flow, apparatus diagrams, system diagrams, and flowcharts that relate to superposition transmission techniques in sidelink communications.

FIG. 1 illustrates an example of a wireless communications system 100 that supports superposition transmission techniques in sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, multiple UEs 115 may communicate using sidelink communications, in which MUST encoding may allow for concurrent sidelink transmissions. In some cases, a transmitting UE 115 may provide an indication of concurrent MUST transmissions in SCI, and a receiving UE 115 that is capable of decoding concurrent MUST transmissions may decode one or both of a MUST base layer communication and a MUST enhancement layer communication. In some cases, the base layer communication may include broadcast or groupcast transmissions to multiple UEs 115, and the enhancement layer communication may include a unicast transmission between the transmitting UE 115 and a single receiving UE 115. In some cases, the indication of concurrent transmissions may be provided in a first stage SCI (e.g., SCI-1), and parameters for decoding the base layer and enhancement layer transmissions may be provided in one or multiple second stage SCI (e.g., SCI-2) transmissions.

Figure 2:
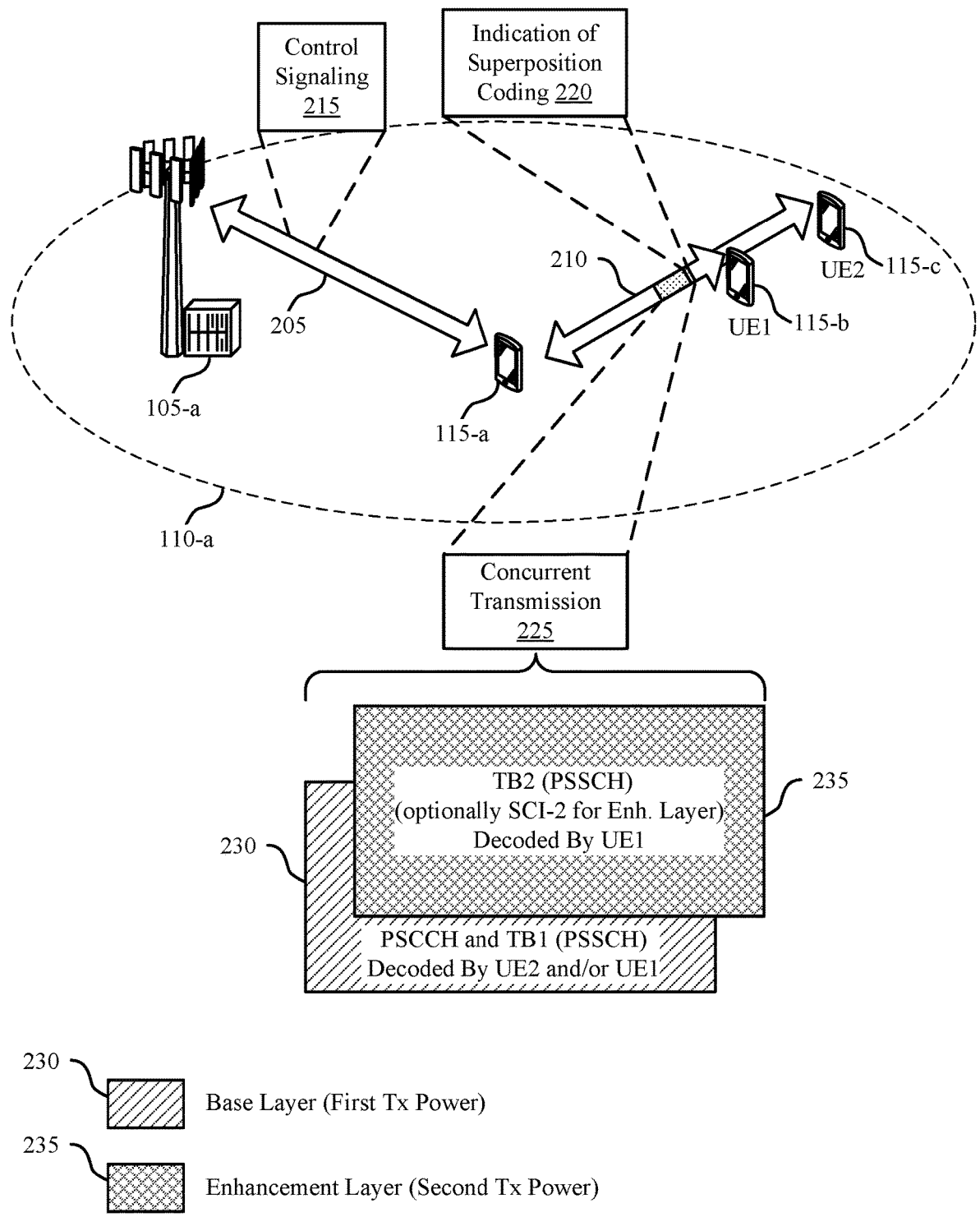
FIG. 2 illustrates an example of a portion of a wireless communications system that supports superposition transmission techniques in sidelink communications in accordance with aspects of the present disclosure.

FIG. 2 illustrates an example of a wireless communications system 200 that supports superposition transmission techniques in sidelink communications in accordance with aspects of the present disclosure. In some examples, wireless communications system 200 may implement aspects of wireless communications system 100. In this example, wireless communications system 200 may include a transmitting UE 115-a, a first receiving UE 115-b, and a second receiving UE 115-c. A base station 105-a may serve coverage area 110-a, and may communicate via one or more links 205 with some or all of the UEs 115. UEs 115 and base station 105-a may be examples of UEs 115 or base stations 105 and may communicate with one another as described above with reference to FIG. 1.

In the example of FIG. 2, the first receiving UE 115-b (which may also be referred to herein as a first UE) may be a near-UE having relatively good channel conditions with the transmitting UE 115-a, and may be capable of operating in a MUST mode (e.g., may be configured for cancellation of MUST interference from a transmission with superimposed signals of both a base layer and an enhancement layer and/or MUST-specific processing) for communications via a sidelink 210 between the first receiving UE 115-b and the transmitting UE 115-a. In some cases, the first receiving UE 115-b may signal a capability for superposition communications to the transmitting UE 115-a, the base station 105-a, or both. In some cases, base station 105-a may provide a resource allocation for sidelink communications in control signaling 215. While control signaling 215 and link 205 are illustrated between the transmitting UE 115-a and the base station 105-a, one or more other links 205 may be present between the base station 105-a and the first receiving UE 115-b, the second receiving UE 115-c, one or multiple other UEs, or any combinations thereof. In some cases, the base station 105-a may configure Mode-1 sidelink communications in which the base station allocated resources to the transmitting UE 115-a for sidelink transmissions. In other cases, the base station 105-a may configure Mode-2 sidelink communications in which the transmitting UE 115-a autonomously selects resources for sidelink communications (e.g., random resource selection, selection based on sensing, etc.).

In some cases, the base station 105-a, or the transmitting UE 115-a, may determine to configure communications via sidelink 210 to operate in a MUST mode (e.g., in RRC signaling from base station 105-a or SCI from the transmitting UE 115-a that configures sidelink resources for MUST communications). The second receiving UE 115-*c*, in some cases, may not be capable of MUST communications and may communicate using base layer encoding only. In other cases, the second receiving UE 115-*c* may be capable of MUST communications, but may not be configured with for MUST communications, and thus MUST operations with the first receiving UE 115-*b* may be transparent to the second receiving UE 115-*c* for communications via sidelink 210. UEs 115 may be example of vehicles in a V2V or V2X wireless communications system.

In some cases, the transmitting UE 115-*a* may transmit an indication of superposition coding 220 to the first receiving UE 115-*b* that indicates that concurrent transmissions 225 include both a base layer 230 transmission and an enhancement layer 235 transmission. The base layer 230 transmission, in some cases, may include a PSCCH and a first TB (e.g., $TB_1$) that is to be decoded at one or both of the first receiving UE 115-*b* or second receiving UE 115-*c*. The base layer 230 transmission may also include one or more SCI-2 transmissions that indicate parameters for one or both of the base layer 230 transmission or the enhancement layer 235 transmission. The enhancement layer 235 transmission may include a PSSCH and a second TB (e.g., $TB_2$), and in some cases may include one or more SCI-2 transmissions that indicate parameters for the enhancement layer 235 transmission. In some cases, the base layer 230 may include broadcast or groupcast communications that are intended for both the first receiving UE 115-*b* and the second receiving UE 115-*c*, and the enhancement layer 235 may include unicast communications that are intended for the first receiving UE 115-*b*. In other cases, the base layer 230 may include unicast transmissions for the second receiving UE 115-*c*, and the enhancement layer 235 may include unicast transmissions for the first receiving UE 115-*b*. In further cases, the base layer 230 and the enhancement layer 235 may provide any combinations of broadcast/groupcast or unicast transmissions. In some cases, the concurrent transmissions 225 may use MUST techniques that provide for superposition of symbols with unequal powers. An example of superposition of symbols with different powers is discussed with reference to FIG. 3. In some cases, broadcast/groupcast communications in $TB_1$ may be mapped to most significant bits (MSBs) of a composite constellation, and unicast communications in TB2 may be mapped to least significant bits (LSBs) of the composite constellation. Such a configuration may be selected, for example, when the unicast link requires less power. Examples of a composite constellation are discussed with reference to FIG. 4.

In some cases, the MUST configuration may be compatible with both MUST-capable UEs as well as UEs that are not MUST-capable (e.g., legacy UEs). In such cases, the SCI-1 transmitted by transmitting UE 115-*a* may be decodable by any UE 115 (e.g., a legacy SCI-1). For example, the SCI-1 may be transmitted in PSCCH based on regular QPSK modulation. In such cases, multiple SCI-2s may be transmitted by the transmitting UE 115-*a*. For example, a first SCI-2 may be used for decoding of the TB mapped to MSBs (e.g., $TB_1$) in the composite constellation, and this first SCI-2 may be one of multiple conventional or legacy SCI-2 formats that follows established resource mapping (e.g., transmitted in PSSCH resource). Accordingly, either a legacy UE or MUST-capable UE can receive and decode $TB_1$ after decoding the first SCI-2. Further, a second SCI-2 for the enhancement layer may transmitted and decoded by a MUST-capable UE. For example, the second SCI-2 may be provided in a medium access control (MAC) control element (CE) that is associated with $TB_1$, and provide one or more parameters to be used to decode $TB_2$ that may be mapped to LSBs of the joint constellation. In such cases, a MUST-capable UE may decode the MAC-CE after decoding $TB_1$, while legacy UEs would skip this MAC-CE when decoding $TB_1$ (e.g., the MAC-CE is transparent to legacy UEs). In this example, the SCI-1 (PSCCH) and first SCI-2 are transmitted using a regular modulation scheme (QPSK), and the data (coded bits in $TB_1$ and $TB_2$) carried in PSSCH are transmitted using superposition modulation (the composite constellation). In other cases, one or more reserved bits in SCI-1 may be used to indicate that the transmission is a superposition transmission, with the indication of the reserved bits being understandable only to MUST-capable UEs. One example of such an implementation is broadcast/groupcast plus unicast superposition, in which a broadcast/groupcast transmission ($TB_1$) can be decoded by both legacy and MUST-capable UEs, and a unicast transmission ($TB_2$) may be decoded only by a MUST-capable UE.

In other examples, the SCI-1 may be transmitted by the transmitting UE 115-*a* as a legacy SCI-1 that is capable of being decoded by an UE 115, and the resource mapping of the SCI-1 may be according to conventional techniques, such as transmission in PSCCH using QPSK modulation. The SCI-1 in such cases may carry resource reservation information, and be decodable by all UEs. In some cases, multiple SCI-2s may be transmitted, where two SCI-2s are transmitted for the two superposed TBs, such that a first SCI-2 is used for decoding of the TB mapped to MSBs ($TB_1$) in the composite constellation, and a second SCI-2 is used to decode the TB mapped to LSBs ($TB_2$) in the joint constellation. In some case, the two SCI-2's may be transmitted in PSSCH resources based on conventional SCI-2 modulation (e.g., QPSK), and the second SCI-2 may be mapped to PSSCH resources following the first SCI-2. In other cases, the two SCI-2s may also be transmitted using superposition technique. In such cases, the first SCI-2 used for $TB_1$ decoding may be mapped to MSBs of SCI-2 modulation symbols, and the second SCI-2 used for $TB_2$ decoding may be mapped to LSBs of SCI-2 modulation symbols. One or more bits in SCI-1 may be used to indicate the SCI-2 transmission is superposition transmission. In such examples, the receiving UEs 115 may perform MUST decoding (e.g., the first receiving UE 115-*b* may expect that there are two SCI-2's). Such SCI-2's used for superposition transmission scheduling may reuse the conventional SCI-2 formats (e.g., only resource mapping or modulation may be different).

In further examples, one or more new SCI-2 formats for sidelink MUST scheduling may be provided. In such examples, a single SCI-2 may transmitted for the sidelink MUST communications, which indicates that the PSSCH transmission is a superposition transmission. The new SCI-2 format may provide information needed to decode the two superposed TBs, such as two destination IDs, two HARQ process IDs, two cast type indicators, etc. In such cases, the new SCI-2 may be transmitted in a PSSCH resource based on conventional SCI-2 modulation (e.g., QPSK), and one or more bits in SCI-1 may be used to indicate the transmission is superposition transmission. Thus, receiving UEs 115 such as the first receiving UE 115-*b* may expect to decode a SCI-2 format that is used for sidelink MUST scheduling. In other cases, the one or more bits in SCI-1 may be used to indicate the new SCI-2 format(s).

In some cases, for sidelink resources allocations in sidelink Mode 2, the sidelink MUST transmission decision may be made at the transmitting UE 115-*a*. For example, the transmitting UE 115-*a* may determine to perform a MUST transmission if two unicast receivers having different distance (e.g., based on a difference of reference signal received powers (RSRPs), SINRs, or geographical distances is larger than a threshold). In other examples, the transmitting UE 115-*a* may determine that a unicast transmission can be superposed with a broadcast/groupcast transmission (e.g., the unicast receiver is close enough to the transmitting UE 115-*a* to support decoding of an enhancement layer transmission). In cases where sidelink resources are allocated in sidelink Mode 1, the base station 105-*a* may schedule the transmitting UE 115-*a* to perform MUST transmission (e.g., based on reports of MUST capability from UEs 115). Additionally or alternatively, the $TB_1$ transmission may be scheduled by the base station 105-*a*, and the transmitting UE 115-*a* may decide to superpose another TB ($TB_2$) in the TB1 transmission. In some cases, the receiving UEs 115-*b* and 115-*c* may report MUST capability to the transmitting UE 115-*a*, to the base station 105-*a*, or any combinations thereof.

Figure 3:
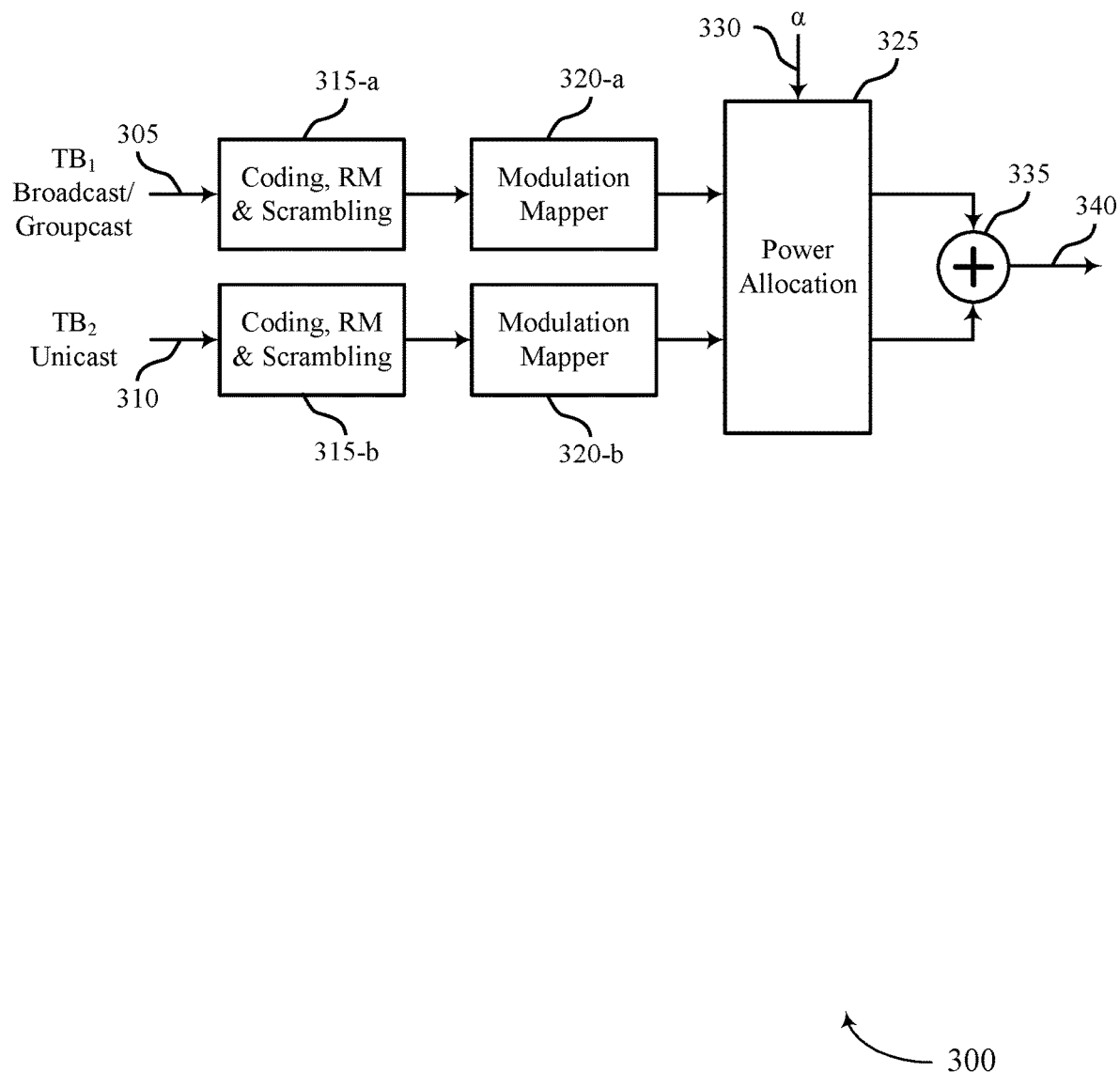
FIG. 3 illustrates an example of a superposition coding system that supports superposition transmission techniques in sidelink communications in accordance with aspects of the present disclosure.

FIG. 3 illustrates an example of a superposition coding system 300 that supports superposition transmission techniques in sidelink communications in accordance with aspects of the present disclosure. In some examples, superposition coding system 300 may be implemented in aspects of wireless communications system 100 or 200. In this example, a first TB 305 (e.g., $TB_1$) may be superposed with a second TB 310 (e.g., $TB_2$), with the first TB 305 transmitted on the base layer and the second TB 310 transmitted on the enhancement layer.

In this example, the first TB 305 may be a broadcast or groupcast TB that is transmitted to multiple receiving UEs, and may be provided to coding, rate matching, and scrambling component 315-*a*. The output of the coding, rate matching, and scrambling component 315-*a* may be provided to modulation mapper 320-*a* that provides constellation mapping (e.g., QPSK). The output of the modulation mapper 320-*a* may be provided to power allocation component 325. Further, the second TB 310 may be a unicast TB that is transmitted to a single receiving UE, and may be provided to coding, rate matching, and scrambling component 315-*b*, modulation mapper 320-*a*, and power allocation component 325. In this example, a transmission power ratio 330, a, may be used at the power allocation component 325 to superposition the modulation symbols from the modulation mappers 320 with different transmission powers. The power scaled modulation symbols may be provided to adder 335 and transmitted by the transmitting UE as a MUST transmission 340. In some cases, the MUST transmission 340 may use adaptive power allocation plus non-Gray mapping (e.g., QAM_1+QAM_2). In other cases, the MUST transmission 340 may use adaptive power allocation plus Gray mapping (e.g., QAM_1+$e^{j\phi}$–QAM_2), or use non-adaptive power allocation.

Figure 4:
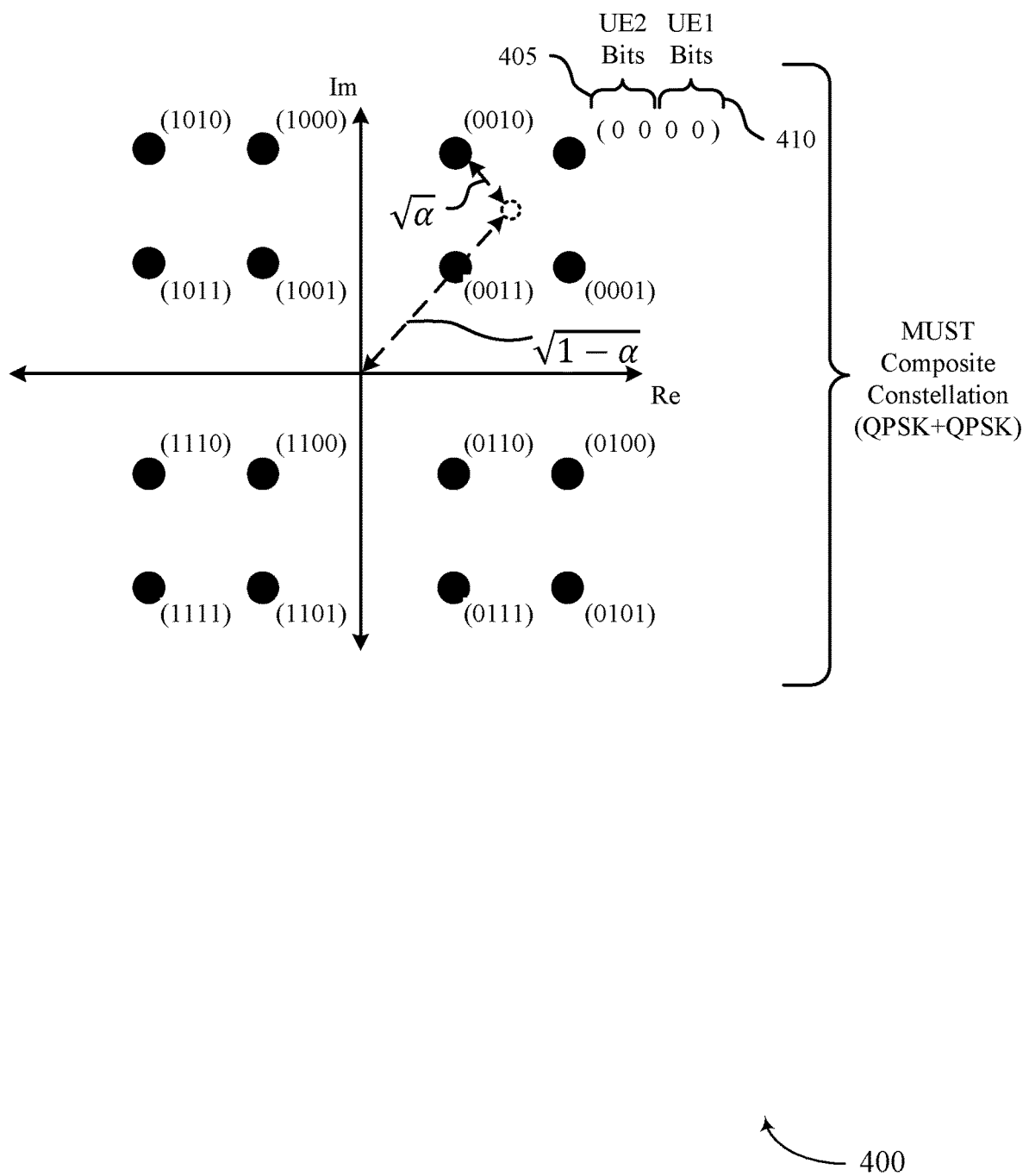
FIG. 4 illustrates an example of a composite constellation for superposition coding that supports superposition transmission techniques in sidelink communications in accordance with aspects of the present disclosure.

FIG. 4 illustrates an example of a composite constellation for superposition coding 400 that supports superposition transmission techniques in sidelink communications in accordance with aspects of the present disclosure. In some examples, composite constellation for superposition coding 400 may be implemented in aspects of wireless communications system 100 or 200.

In this example, a MUST composite constellation may be a QPSK+QPSK constellation, in which the MSBs 405 of each constellation point are for the base layer transmissions (e.g., far-UE or second receiving UE transmissions). In some cases, the base layer transmissions may be groupcast or broadcast transmissions that are intended for multiple receiving UEs. In other cases, base layer transmissions may be unicast transmissions to a receiving UE that has poorer channel conditions relative to another UE that is to receive an enhancement layer transmission. In the example of FIG. 4, the LSBs 410 of each constellation point are for the enhancement layer transmissions (e.g., near-UE or first receiving UE transmissions). In some cases, the base layer and enhancement layer transmissions may have a transmission power ratio for near UE of a, where the base layer or MSBs 405 are scaled as $\sqrt{\alpha}$ and the enhancement layer of LSBs are scaled as $\sqrt{1-\alpha}$. Thus, UEs receiving the base layer MSBs 405 only decode MSBs 405 (e.g., $TB_1$) in the composite constellation, and UEs receiving the enhancement layer LSBs 410 may decode MSBs 405 first, then decode LSBs 410 (e.g., $TB_2$) based on MSB decoding outcome (e.g., by performing successive interference cancellation). As discussed herein, in some cases the UE receiving the enhancement layer communication may also receive the base layer communication, and thus spectral efficiency of sidelink communications may be further increased.

Figure 5:
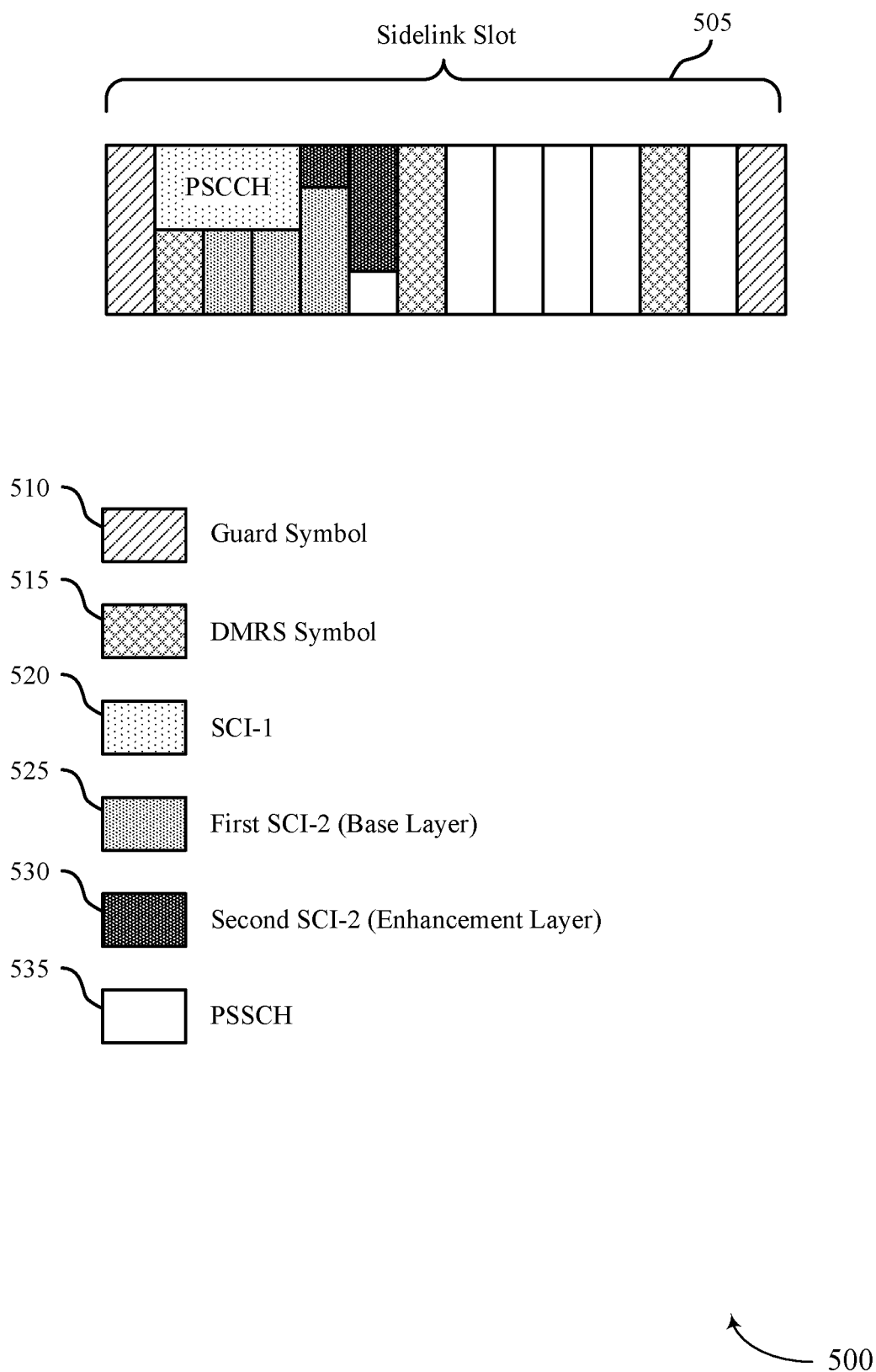
FIG. 5 illustrates an example of sidelink resources that support superposition transmission techniques in sidelink communications in accordance with aspects of the present disclosure.

FIG. 5 illustrates an example of sidelink resources 500 that support superposition transmission techniques in sidelink communications in accordance with aspects of the present disclosure. In some examples, sidelink resources 500 may implement aspects of wireless communications systems 100 or 200. As discussed herein, in some cases MUST techniques may be used by a transmitting UE to transmit base layer and enhancement layer transmission to one or more receiving UEs. Sidelink resources 500 provide for mapping of SCI that may provide parameters for decoding MUST communications in accordance with various aspects discussed herein.

In some cases, a sidelink slot 505 may use resources that are allocated for sidelink communications between multiple UEs. For example, a base station may allocate resources for sidelink communications, and sidelink UEs may use Mode 1 or Mode 2 for sidelink communications. In some cases guard symbols 510 may be provided at the boundaries of slot 505. While two guard symbols 510 are illustrated, in other cases one or even zero guard symbols may be used. The sidelink slot 505 may include multiple demodulation reference signal (DMRS) symbols 515, that a receiving UE may use for demodulation of received transmissions. In this example, PSSCH resources configured in the sidelink slot 505 may include SCI-1 520 resources. As discussed with reference to FIG. 2, in some cases the SCI-1 may include one or more parameters that may be used for demodulation of one or both of the base layer and enhancement layer transmissions, such as a resource allocation and MCS. In some cases, one or more bits of the SCI-1 520 may indicate whether superposition coding is used.

In the example of FIG. 5, first SCI-2 525 resources may be mapped to PSSCH resources and may provide one or more parameters for the base layer transmission, such as a cast type (e.g., unicast, broadcast, groupcast), and source and destination IDs. Further, second SCI-2 530 resources may be mapped to PSSCH resources and may provide one or more parameters for the enhancement layer transmission, such as a cast type (e.g., unicast, broadcast, groupcast), and source and destination IDs, and power scaling factor (e.g., α). Remaining PSSCH resources 535 may include superposed base layer and enhancement layer constellations. In other examples, as discussed with reference to FIG. 2, only a single SCI-2 may be transmitted that includes parameters for both the base layer and enhancement layer. Further, in some cases as also discussed with reference to FIG. 2, the first SCI-2 525 and the second SCI-2 530 may also be superposed.

Figure 6:
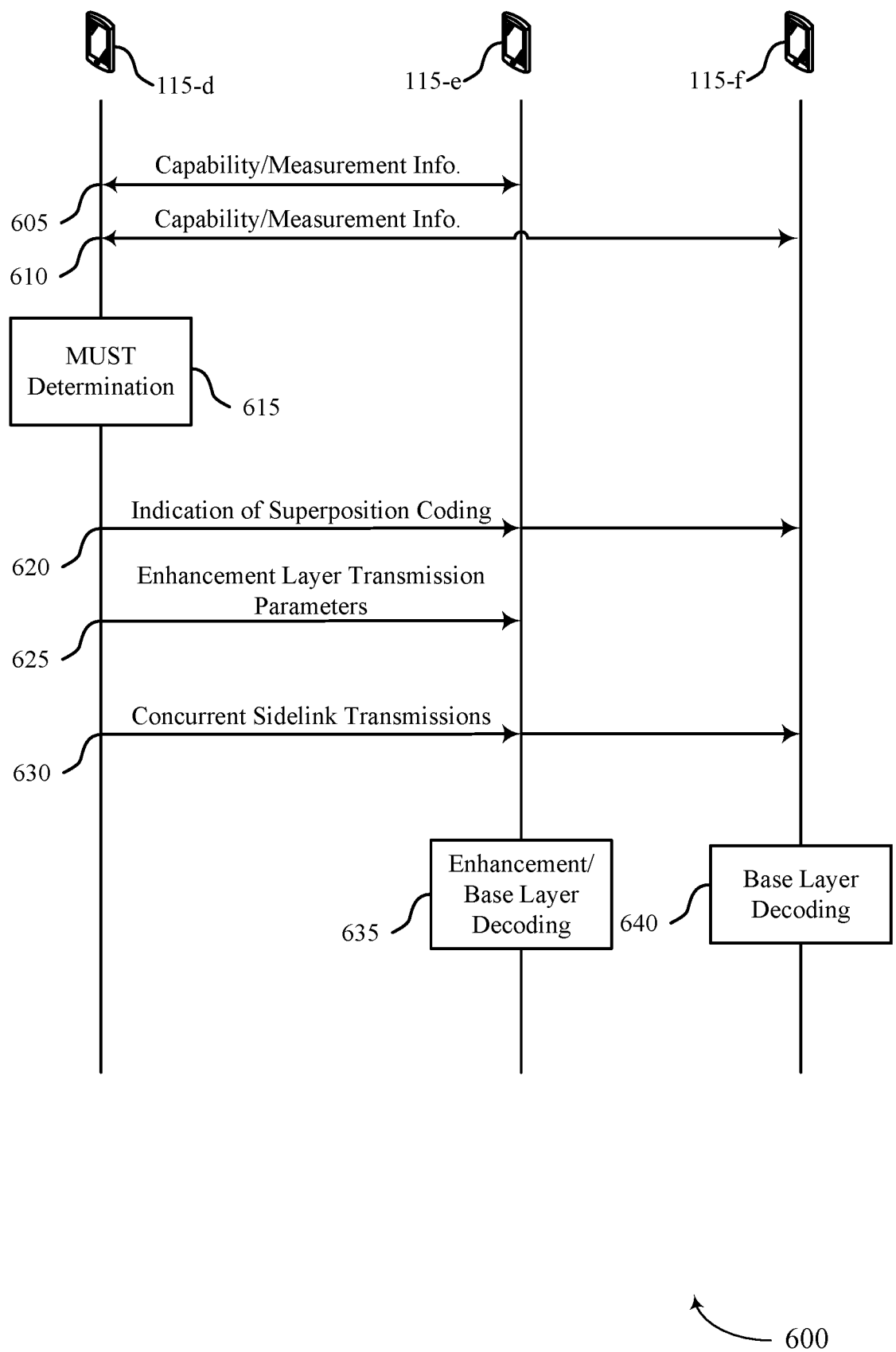
FIG. 6 illustrates an example of a process flow that supports superposition transmission techniques in sidelink communications in accordance with aspects of the present disclosure.

FIG. 6 illustrates an example of a process flow 600 that supports superposition transmission techniques in sidelink communications in accordance with aspects of the present disclosure. In some examples, process flow 600 may implement aspects of wireless communication systems 100 or 200. In this example, a transmitting UE 115-d, a first receiving UE 115-e and a second receiving UE 115-f may be configured (e.g., by a base station) for sidelink communications, and may be examples of UEs 115 as described with reference to FIGS. 1 and 2. UEs 115 may be examples of vehicles, such as in a V2V or V2X wireless communications system.

At 605, the transmitting UE 115-d and first receiving UE 115-e may exchange capability and measurement information. For example, the first receiving UE 115-e may provide a MUST capability indication to the transmitting UE 115-d, and the transmitting UE 115-d may provide configuration or resource allocation information that indicates MUST communications are enabled. Further, in some cases, the first receiving UE 115-e may provide a measurement report that indicates a channel quality as measured at the first receiving UE 115-e (e.g., based on a sidelink message from the transmitting UE 115-d that may be used for a sidelink path loss determination). Similarly, at 610, the transmitting UE 115-d and the second receiving UE 115-f may exchange capability and measurement information. In other cases, each of the UEs 115 may provide capability information to a serving base station, which may configure sidelink communications, including MUST communications between some or all sidelink UEs.

At 615, the transmitting UE 115-d may determine if MUST communications are to be used for sidelink communications. In some cases, the transmitting UE 115-d may determine that channel conditions between the transmitting UE 115-d and the first receiving UE 115-e may support enhancement layer communications. In some cases, such a determination may be based on measurements of signals from the first receiving UE 115-e, based on a channel quality indication provided from the first receiving UE 115-e, or any combinations thereof. In some cases, a RSRP, SINR, geographical distance, or combinations thereof having a value that is larger than a threshold may indicate that the first receiving UE 115-e may support MUST communications and reception of enhancement layer transmissions.

At 620, the transmitting UE 115-d may transmit an indication of superposition coding to one or both of the first receiving UE 115-e or second receiving UE 115-f. In some cases, the indication of superposition coding may be provided in a first stage SCI (e.g., SCI-1) transmission. In other cases, the indication of superposition coding may be provided by a second stage SCI (e.g., SCI-2) transmission. In some cases, the first stage SCI may provide one or more parameters that may be used for decoding of a base layer transmission from the transmitting UE. Further, the second stage SCI (e.g., a first SCI-2 transmission) may provide one or more parameters for decoding the base layer transmission (e.g., source/destination ID, cast type).

At 625, the transmitting UE 115-d may transmit an indication of enhancement layer transmission parameters to the first receiving UE 115-e. In some cases, the indication of the enhancement layer transmission parameters may be provided in a second SCI-2 transmission. In some cases the second SCI-2 transmission may be mapped to resources following the first SCI-2 transmission, or may be superposed with the first SCI-2 transmission. In other cases, a single SCI-2 transmission may provide parameters for both the base layer and enhancement layer.

At 630, the transmitting UE 115-d may transmit the concurrent sidelink transmissions to both the first receiving UE 115-e and the second receiving UE 115-f. At 635, the first receiving UE 115-e may decode one or both of the base layer and enhancement layer transmissions. In some cases, the base layer transmission may be a groupcast or broadcast transmission that is intended for the first receiving UE 115-e, and the enhancement layer transmission may be a unicast transmission for the first receiving UE 115-e. In such cases, the first receiving UE 115-e may decode both transmissions. In other cases, the base layer transmission may not be intended for the first receiving UE 115-e, and in such cases the first receiving UE 115-e may discard the decoded base layer transmission. At 640, the second receiving UE 115-f may decode the base layer transmission. In some cases, the second receiving UE 115-f may be a legacy UE that is not capable of decoding MUST transmissions, and the MUST communications are backward compatible such that the transmission of the enhancement layer in the concurrent sidelink transmission is transparent to the second receiving UE 115-f (e.g., base layer transmissions are decodable based on SCI-1 and the first SCI-2 in accordance with legacy sidelink or PC5 communications).

Figure 7:
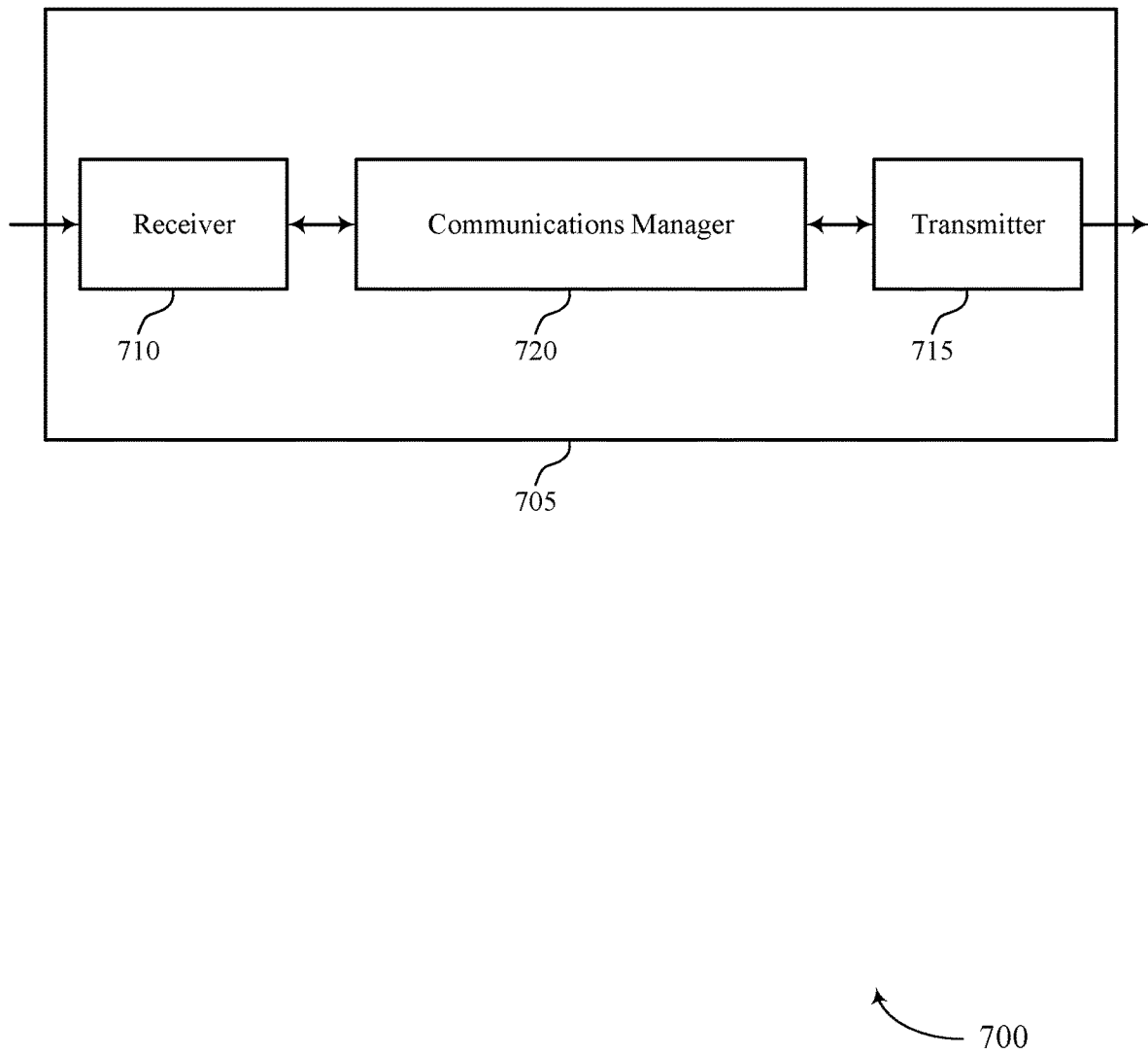
FIGS. 7 and 8 show block diagrams of devices that support superposition transmission techniques in sidelink communications in accordance with aspects of the present disclosure.

FIG. 7 shows a block diagram 700 of a device 705 that supports superposition transmission techniques in sidelink communications in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to superposition transmission techniques in sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to superposition transmission techniques in sidelink communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of superposition transmission techniques in sidelink communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for receiving, from a transmitting UE, an indication that superposition coding is used to concurrently transmit a sidelink base layer transmission and a sidelink enhancement layer transmission in a sidelink communication from the transmitting UE. The communications manager 720 may be configured as or otherwise support a means for receiving, based on the indication, one or more stage-two sidelink control information transmissions that provide one or more parameters for one or more of the sidelink base layer transmission or the sidelink enhancement layer transmission. The communications manager 720 may be configured as or otherwise support a means for decoding, basing at least in part on the one or more parameters, one or more of the sidelink base layer transmission or the sidelink enhancement layer transmission.

Additionally or alternatively, the communications manager 720 may support wireless communications at a transmitting UE in accordance with examples as disclosed herein. For example, the communications manager 720 may be configured as or otherwise support a means for transmitting, to one or more receiving UEs, an indication that superposition coding is used to concurrently transmit a sidelink base layer transmission and a sidelink enhancement layer transmission in a sidelink communication from the transmitting UE. The communications manager 720 may be configured as or otherwise support a means for transmitting, to the one or more receiving UEs, one or more stage-two sidelink control information transmissions that provide one or more parameters for one or more of the sidelink base layer transmission or the sidelink enhancement layer transmission. The communications manager 720 may be configured as or otherwise support a means for encoding, based on the one or more parameters, the sidelink base layer transmission and the sidelink enhancement layer transmission into the sidelink communication. The communications manager 720 may be configured as or otherwise support a means for transmitting the sidelink communication to the one or more receiving UEs.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for superposition coding of sidelink communications that provide for enhanced spectral efficiency, reduced latency, and more efficient utilization of communication resources.

Figure 8:
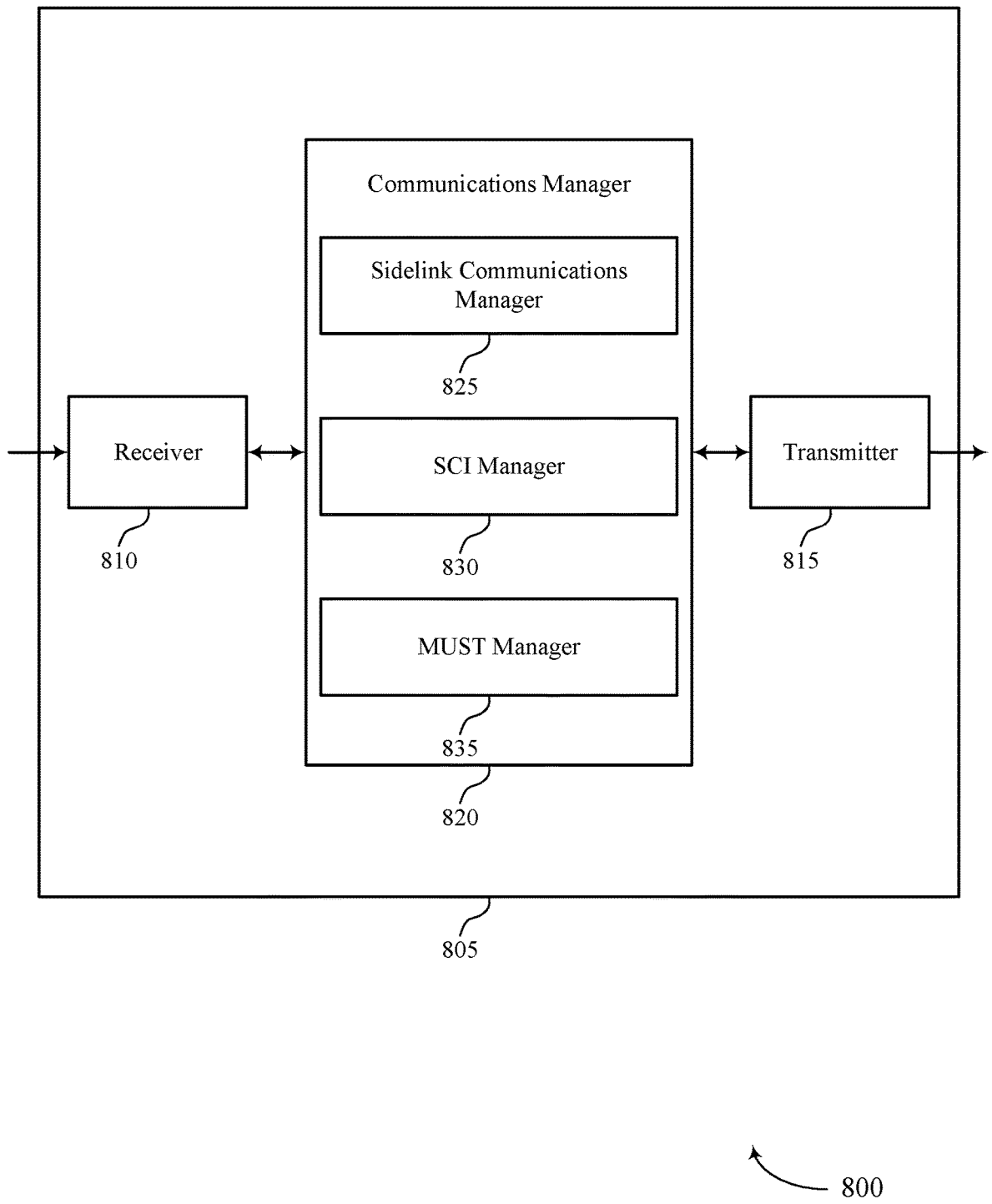

FIG. 8 shows a block diagram 800 of a device 805 that supports superposition transmission techniques in sidelink communications in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to superposition transmission techniques in sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to superposition transmission techniques in sidelink communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of superposition transmission techniques in sidelink communications as described herein. For example, the communications manager 820 may include a sidelink communications manager 825, an SCI manager 830, an MUST manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The sidelink communications manager 825 may be configured as or otherwise support a means for receiving, from a transmitting UE, an indication that superposition coding is used to concurrently transmit a sidelink base layer transmission and a sidelink enhancement layer transmission in a sidelink communication from the transmitting UE. The SCI manager 830 may be configured as or otherwise support a means for receiving, based on the indication, one or more stage-two sidelink control information transmissions that provide one or more parameters for one or more of the sidelink base layer transmission or the sidelink enhancement layer transmission. The MUST manager 835 may be configured as or otherwise support a means for decoding, based on the one or more parameters, one or more of the sidelink base layer transmission or the sidelink enhancement layer transmission.

Additionally or alternatively, the communications manager 820 may support wireless communications at a transmitting UE in accordance with examples as disclosed herein. The sidelink communications manager 825 may be configured as or otherwise support a means for transmitting, to one or more receiving UEs, an indication that superposition coding is used to concurrently transmit a sidelink base layer transmission and a sidelink enhancement layer transmission in a sidelink communication from the transmitting UE. The SCI manager 830 may be configured as or otherwise support a means for transmitting, to the one or more receiving UEs, one or more stage-two sidelink control information transmissions that provide one or more parameters for one or more of the sidelink base layer transmission or the sidelink enhancement layer transmission. The MUST manager 835 may be configured as or otherwise support a means for encoding, based on the one or more parameters, the sidelink base layer transmission and the sidelink enhancement layer transmission into the sidelink communication. The sidelink communications manager 825 may be configured as or otherwise support a means for transmitting the sidelink communication to the one or more receiving UEs.

Figure 9:
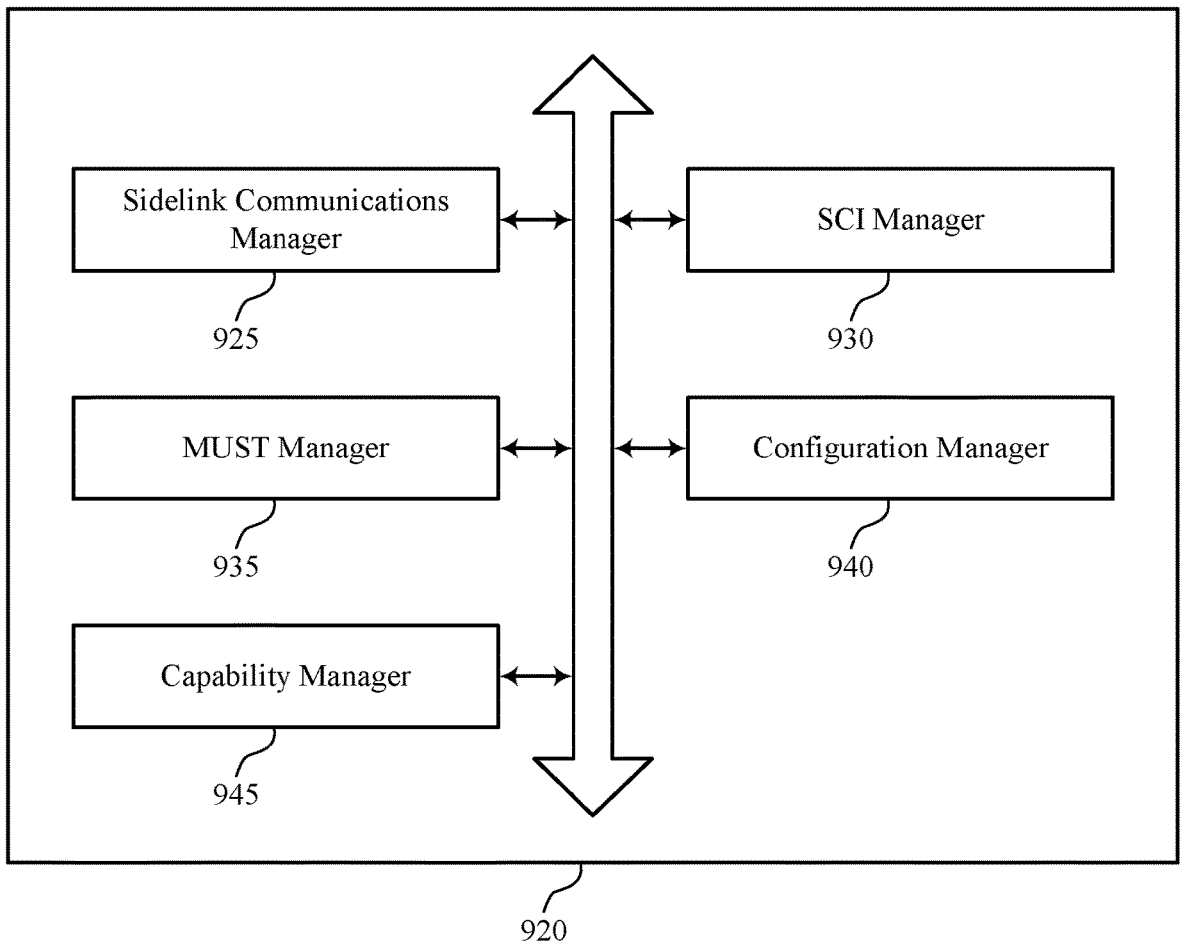
FIG. 9 shows a block diagram of a communications manager that supports superposition transmission techniques in sidelink communications in accordance with aspects of the present disclosure.

FIG. 9 shows a block diagram 900 of a communications manager 920 that supports superposition transmission techniques in sidelink communications in accordance with aspects of the present disclosure. The communications manager 920 may be an example of aspects of a communications manager 720, a communications manager 820, or both, as described herein. The communications manager 920, or various components thereof, may be an example of means for performing various aspects of superposition transmission techniques in sidelink communications as described herein. For example, the communications manager 920 may include a sidelink communications manager 925, an SCI manager 930, an MUST manager 935, a configuration manager 940, a capability manager 945, or any combination thereof. Each of these components may communicate, directly or indirectly, with one another (e.g., via one or more buses).

The communications manager 920 may support wireless communications at a first UE in accordance with examples as disclosed herein. The sidelink communications manager 925 may be configured as or otherwise support a means for receiving, from a transmitting UE, an indication that superposition coding is used to concurrently transmit a sidelink base layer transmission and a sidelink enhancement layer transmission in a sidelink communication from the transmitting UE. The SCI manager 930 may be configured as or otherwise support a means for receiving, based on the indication, one or more stage-two sidelink control information transmissions that provide one or more parameters for one or more of the sidelink base layer transmission or the sidelink enhancement layer transmission. The MUST manager 935 may be configured as or otherwise support a means for decoding, based on the one or more parameters, one or more of the sidelink base layer transmission or the sidelink enhancement layer transmission.

In some examples, the indication that superposition coding is used to concurrently transmit the sidelink base layer transmission and the sidelink enhancement layer transmission is received in a stage-one sidelink control information transmission.

In some examples, to support decoding, the MUST manager 935 may be configured as or otherwise support a means for decoding both the sidelink base layer transmission and the sidelink enhancement layer transmission. In some examples, the sidelink base layer transmission includes broadcast or groupcast information that is transmitted multiple receiving UEs, and the sidelink enhancement layer transmission includes unicast information that is transmitted to the first UE from the transmitting UE.

In some examples, to support receiving the one or more stage-two sidelink control information transmissions, the SCI manager 930 may be configured as or otherwise support a means for receiving, based on a stage-one sidelink control information transmission, a first stage-two sidelink control information transmission that provides a first set of parameters for the sidelink base layer transmission. In some examples, to support receiving the one or more stage-two sidelink control information transmissions, the SCI manager 930 may be configured as or otherwise support a means for receiving, based on the indication in the stage-one sidelink control information transmission, a second stage-two sidelink control information transmission that provides a second set of parameters for the sidelink enhancement layer transmission.

In some examples, to support decoding, the MUST manager 935 may be configured as or otherwise support a means for decoding the sidelink base layer transmission based on the first set of parameters in the first stage-two sidelink control information transmission. In some examples, to support decoding, the MUST manager 935 may be configured as or otherwise support a means for decoding the sidelink enhancement layer transmission based on the second set of parameters in the second stage-two sidelink control information transmission. In some examples, the second stage-two sidelink control information transmission is transmitted as a MAC-CE associated with a transport block that is decoded based on the first stage-two sidelink control information transmission.

In some examples, the first stage-two sidelink control information transmission has a first format, and the second stage-two sidelink control information transmission has a second format that is different than the first format. In some examples, a stage-one sidelink control information transmission includes one or more bits that indicate that superposition coding is being used to concurrently transmit the sidelink base layer transmission and the sidelink enhancement layer transmission in the sidelink communication from the transmitting UE. In some examples, the one or more stage-two sidelink control information transmissions include a first stage-two sidelink control information transmission and a second stage-two sidelink control information transmission that are concurrently transmitted in a same set of sidelink control information resources using superposition coding. In some examples, the one or more stage-two sidelink control information transmissions include a single stage-two sidelink control information transmission that provides both a first set of parameters for the sidelink base layer transmission and a second set of parameters for the sidelink enhancement layer transmission.

In some examples, the configuration manager 940 may be configured as or otherwise support a means for receiving, from the transmitting UE or from a serving base station, configuration information that enables superposition coding to be used for concurrent transmissions of the sidelink base layer transmission and the sidelink enhancement layer transmission. In some examples, the capability manager 945 may be configured as or otherwise support a means for transmitting, to the transmitting UE or to the serving base station, a capability indication that indicates that the first UE has a capability for decoding concurrent transmissions of the sidelink base layer transmission and the sidelink enhancement layer transmission.

Additionally or alternatively, the communications manager 920 may support wireless communications at a transmitting UE in accordance with examples as disclosed herein. In some examples, the sidelink communications manager 925 may be configured as or otherwise support a means for transmitting, to one or more receiving UEs, an indication that superposition coding is used to concurrently transmit a sidelink base layer transmission and a sidelink enhancement layer transmission in a sidelink communication from the transmitting UE. In some examples, the SCI manager 930 may be configured as or otherwise support a means for transmitting, to the one or more receiving UEs, one or more stage-two sidelink control information transmissions that provide one or more parameters for one or more of the sidelink base layer transmission or the sidelink enhancement layer transmission. In some examples, the MUST manager 935 may be configured as or otherwise support a means for encoding, based on the one or more parameters, the sidelink base layer transmission and the sidelink enhancement layer transmission into the sidelink communication. In some examples, the sidelink communications manager 925 may be configured as or otherwise support a means for transmitting the sidelink communication to the one or more receiving UEs.

In some examples, the indication that superposition coding is used to concurrently transmit the sidelink base layer transmission and the sidelink enhancement layer transmission is transmitted in a stage-one sidelink control information transmission. In some examples, both the sidelink base layer transmission and the sidelink enhancement layer transmission are transmitted to a first UE for decoding at the first UE. In some examples, the sidelink base layer transmission includes broadcast or groupcast information that is transmitted to multiple receiving UEs, and the sidelink enhancement layer transmission includes unicast information that is transmitted to only the first UE.

In some examples, to support transmitting the one or more stage-two sidelink control information transmissions, the SCI manager 930 may be configured as or otherwise support a means for transmitting a first stage-two sidelink control information transmission that provides a first set of parameters for the sidelink base layer transmission. In some examples, to support transmitting the one or more stage-two sidelink control information transmissions, the SCI manager 930 may be configured as or otherwise support a means for transmitting a second stage-two sidelink control information transmission that provides a second set of parameters for the sidelink enhancement layer transmission.

In some examples, the second stage-two sidelink control information transmission is transmitted as a MAC-CE associated with a first transport block of the sidelink base layer transmission, that is decoded based on the first stage-two sidelink control information transmission. In some examples, a stage-one sidelink control information transmission includes one or more bits that indicate that superposition coding is being used to concurrently transmit the sidelink base layer transmission and the sidelink enhancement layer transmission in the sidelink communication from the transmitting UE. In some examples, the one or more stage-two sidelink control information transmissions include a first stage-two sidelink control information transmission and a second stage-two sidelink control information transmission that are concurrently transmitted in a same set of sidelink control information resources using superposition coding. In some examples, the one or more stage-two sidelink control information transmissions include a single stage-two sidelink control information transmission that provides both a first set of parameters for the sidelink base layer transmission and a second set of parameters for the sidelink enhancement layer transmission.

In some examples, the configuration manager 940 may be configured as or otherwise support a means for transmitting configuration information that enables superposition coding to be used for concurrent transmissions of the sidelink base layer transmission and the sidelink enhancement layer transmission. In some examples, the capability manager 945 may be configured as or otherwise support a means for receiving, from one or more UEs, a capability indication that indicates a capability for decoding concurrent transmissions of the sidelink base layer transmission and the sidelink enhancement layer transmission.

Figure 10:
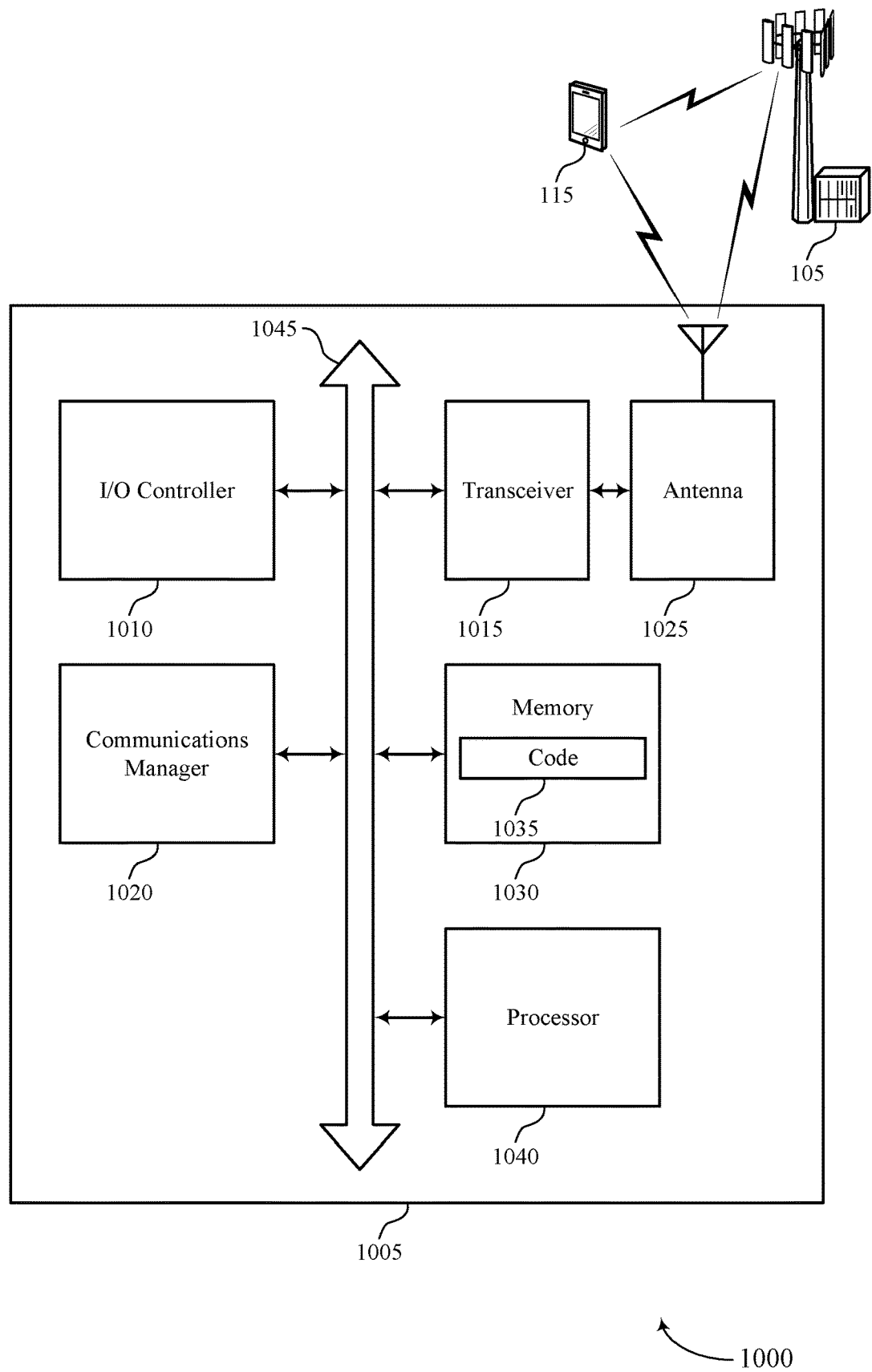
FIG. 10 shows a diagram of a system including a device that supports superposition transmission techniques in sidelink communications in accordance with aspects of the present disclosure.

FIG. 10 shows a diagram of a system 1000 including a device 1005 that supports superposition transmission techniques in sidelink communications in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting superposition transmission techniques in sidelink communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for receiving, from a transmitting UE, an indication that superposition coding is used to concurrently transmit a sidelink base layer transmission and a sidelink enhancement layer transmission in a sidelink communication from the transmitting UE. The communications manager 1020 may be configured as or otherwise support a means for receiving, based on the indication, one or more stage-two sidelink control information transmissions that provide one or more parameters for one or more of the sidelink base layer transmission or the sidelink enhancement layer transmission. The communications manager 1020 may be configured as or otherwise support a means for decoding, basing at least in part on the one or more parameters, one or more of the sidelink base layer transmission or the sidelink enhancement layer transmission.

Additionally or alternatively, the communications manager 1020 may support wireless communications at a transmitting UE in accordance with examples as disclosed herein. For example, the communications manager 1020 may be configured as or otherwise support a means for transmitting, to one or more receiving UEs, an indication that superposition coding is used to concurrently transmit a sidelink base layer transmission and a sidelink enhancement layer transmission in a sidelink communication from the transmitting UE. The communications manager 1020 may be configured as or otherwise support a means for transmitting, to the one or more receiving UEs, one or more stage-two sidelink control information transmissions that provide one or more parameters for one or more of the sidelink base layer transmission or the sidelink enhancement layer transmission. The communications manager 1020 may be configured as or otherwise support a means for encoding, based on the one or more parameters, the sidelink base layer transmission and the sidelink enhancement layer transmission into the sidelink communication. The communications manager 1020 may be configured as or otherwise support a means for transmitting the sidelink communication to the one or more receiving UEs.

By including or configuring the communications manager 1020 in accordance with examples as described herein, the device 1005 may support techniques for superposition coding of sidelink communications that provide for enhanced spectral efficiency, reduced latency, more efficient utilization of communication resources, improved communication reliability, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of superposition transmission techniques in sidelink communications as described herein, or the processor 1040 and the memory 1030 may be otherwise configured to perform or support such operations.

Figure 11:
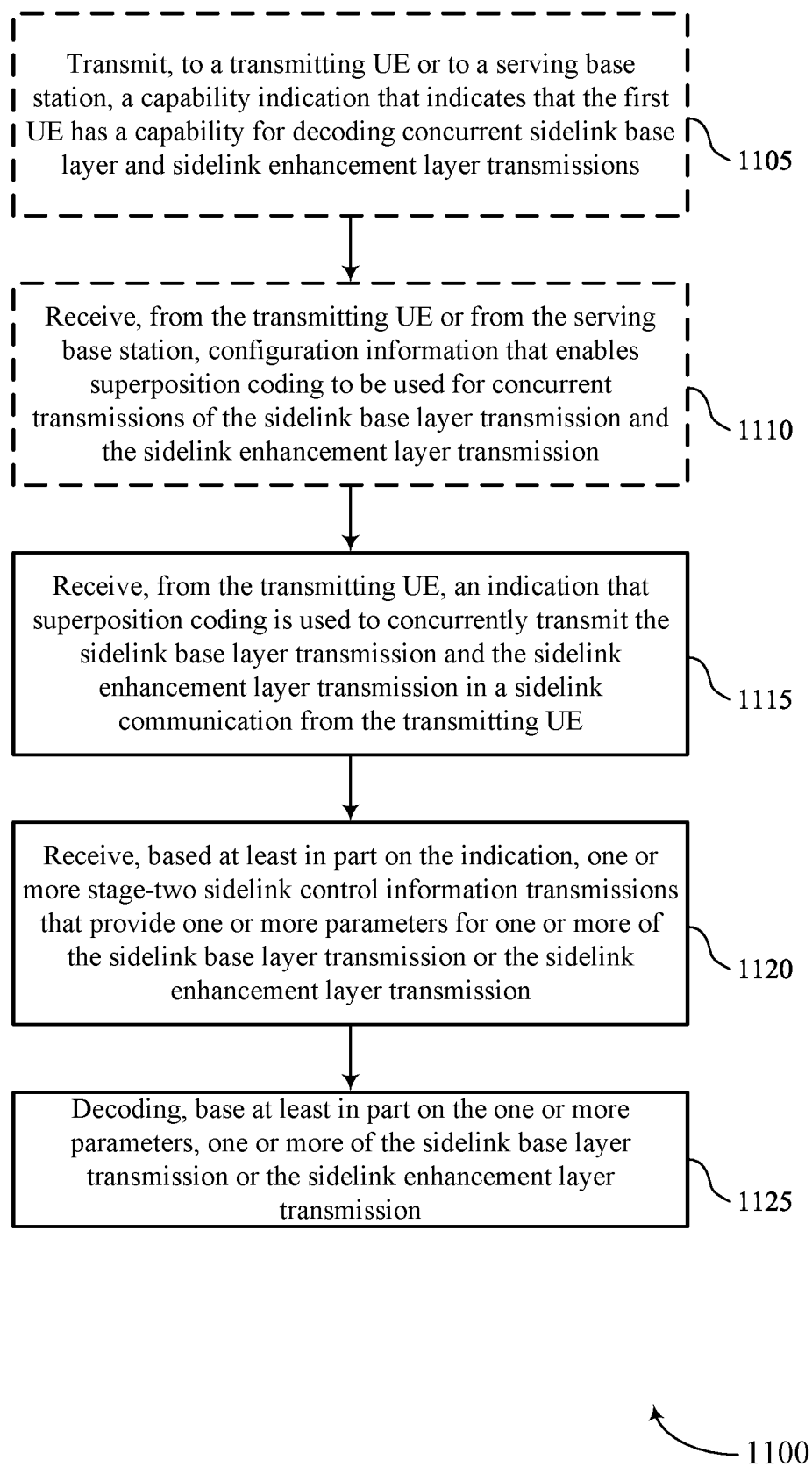
FIGS. 11 through 15 show flowcharts illustrating methods that support superposition transmission techniques in sidelink communications in accordance with aspects of the present disclosure.

FIG. 11 shows a flowchart illustrating a method 1100 that supports superposition transmission techniques in sidelink communications in accordance with aspects of the present disclosure. The operations of the method 1100 may be implemented by a receiving UE (or first UE) or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

Optionally, at 1105, the method may include transmitting, to a transmitting UE or to a serving base station, a capability indication that indicates that the first UE has a capability for decoding concurrent transmissions sidelink base layer and sidelink enhancement layer transmissions. The operations of 1105 may be performed in accordance with examples as disclosed herein. In some examples, aspects of the operations of 1105 may be performed by a capability manager 945 as described with reference to FIG. 9.

Optionally, at 1110, the method may include receiving, from the transmitting UE or from the serving base station, configuration information that enables superposition coding to be used for concurrent transmissions of the sidelink base layer transmission and the sidelink enhancement layer transmission. The operations of 1110 may be performed in accordance with examples as disclosed herein. In some examples, aspects of the operations of 1110 may be performed by a configuration manager 940 as described with reference to FIG. 9.

At 1115, the method may include receiving, from the transmitting UE, an indication that superposition coding is used to concurrently transmit the sidelink base layer transmission and the sidelink enhancement layer transmission in a sidelink communication from the transmitting UE. The operations of 1115 may be performed in accordance with examples as disclosed herein. In some examples, aspects of the operations of 1115 may be performed by a sidelink communications manager 925 as described with reference to FIG. 9.

At 1120, the method may include receiving, based on the indication, one or more stage-two sidelink control information transmissions that provide one or more parameters for one or more of the sidelink base layer transmission or the sidelink enhancement layer transmission. The operations of 1120 may be performed in accordance with examples as disclosed herein. In some examples, aspects of the operations of 1120 may be performed by an SCI manager 930 as described with reference to FIG. 9.

At 1125, the method may include decoding, based on the one or more parameters, one or more of the sidelink base layer transmission or the sidelink enhancement layer transmission. The operations of 1125 may be performed in accordance with examples as disclosed herein. In some examples, aspects of the operations of 1125 may be performed by an MUST manager 935 as described with reference to FIG. 9. In some cases, the first UE may decode both the sidelink base layer transmission and the sidelink enhancement layer transmission. In other cases, the first UE may decode only one of the sidelink base layer transmission or the sidelink enhancement layer transmission.

Figure 12:
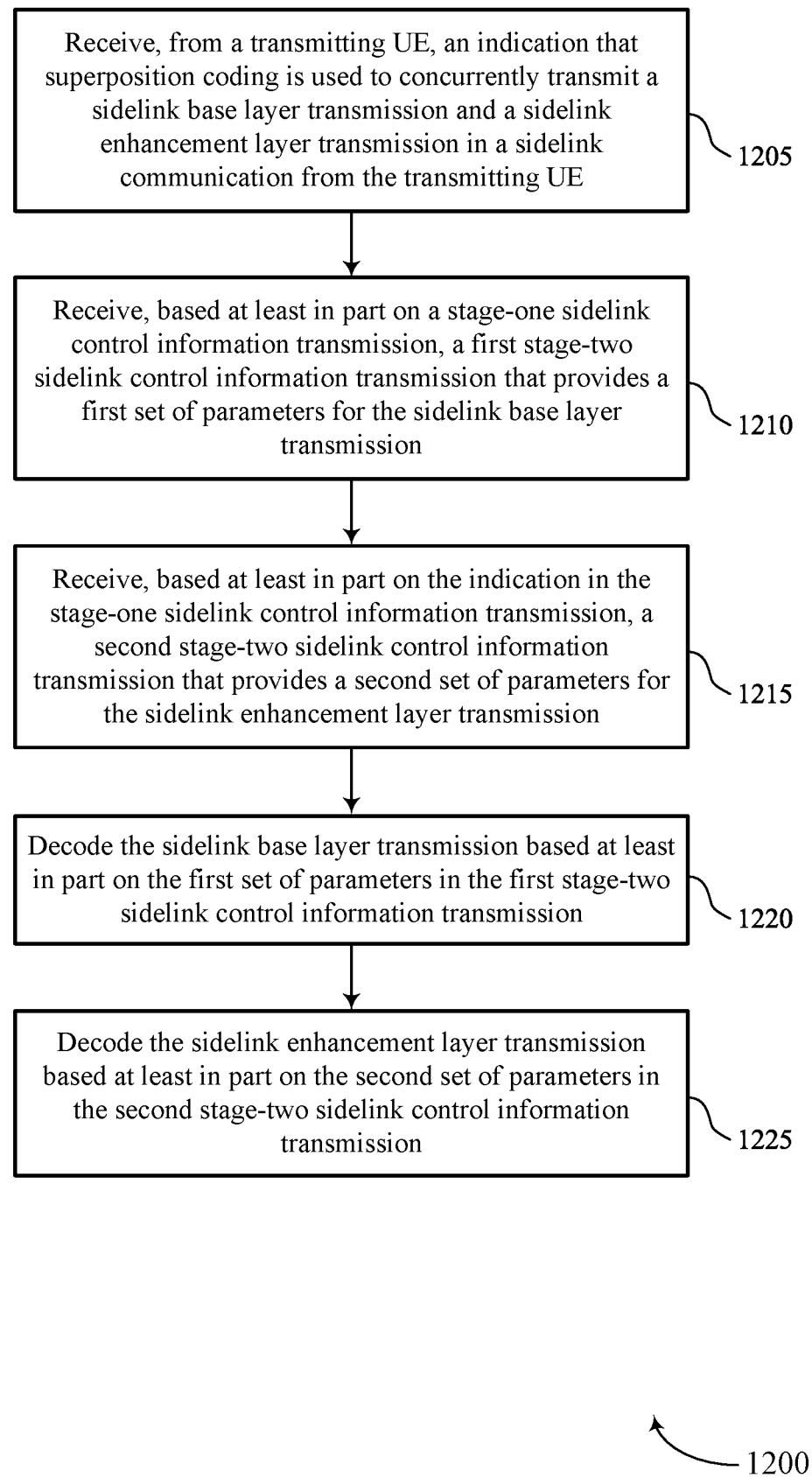

FIG. 12 shows a flowchart illustrating a method 1200 that supports superposition transmission techniques in sidelink communications in accordance with aspects of the present disclosure. The operations of the method 1200 may be implemented by a receiving UE (or a first UE) or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving, from a transmitting UE, an indication that superposition coding is used to concurrently transmit a sidelink base layer transmission and a sidelink enhancement layer transmission in a sidelink communication from the transmitting UE. The operations of 1205 may be performed in accordance with examples as disclosed herein. In some examples, aspects of the operations of 1205 may be performed by a sidelink communications manager 925 as described with reference to FIG. 9.

At 1210, the method may include receiving, based on a stage-one sidelink control information transmission, a first stage-two sidelink control information transmission that provides a first set of parameters for the sidelink base layer transmission. The operations of 1210 may be performed in accordance with examples as disclosed herein. In some examples, aspects of the operations of 1210 may be performed by an SCI manager 930 as described with reference to FIG. 9.

At 1215, the method may include receiving, based on the indication in the stage-one sidelink control information transmission, a second stage-two sidelink control information transmission that provides a second set of parameters for the sidelink enhancement layer transmission. The operations of 1215 may be performed in accordance with examples as disclosed herein. In some examples, aspects of the operations of 1215 may be performed by an SCI manager 930 as described with reference to FIG. 9.

At 1220, the method may include decoding the sidelink base layer transmission based on the first set of parameters in the first stage-two sidelink control information transmission. The operations of 1220 may be performed in accordance with examples as disclosed herein. In some examples, aspects of the operations of 1220 may be performed by an MUST manager 935 as described with reference to FIG. 9.

At 1225, the method may include decoding the sidelink enhancement layer transmission based on the second set of parameters in the second stage-two sidelink control information transmission. The operations of 1225 may be performed in accordance with examples as disclosed herein. In some examples, aspects of the operations of 1225 may be performed by an MUST manager 935 as described with reference to FIG. 9. In some cases, the second stage-two sidelink control information transmission being transmitted as a MAC-CE associated with a transport block that is decoded based on the first stage-two sidelink control information transmission. In some cases, the first stage-two sidelink control information transmission has a first format that is a legacy SCI format, and the second stage-two sidelink control information transmission has a second format that is different than the first format and is a new SCI format for MUST communications.

Figure 13:
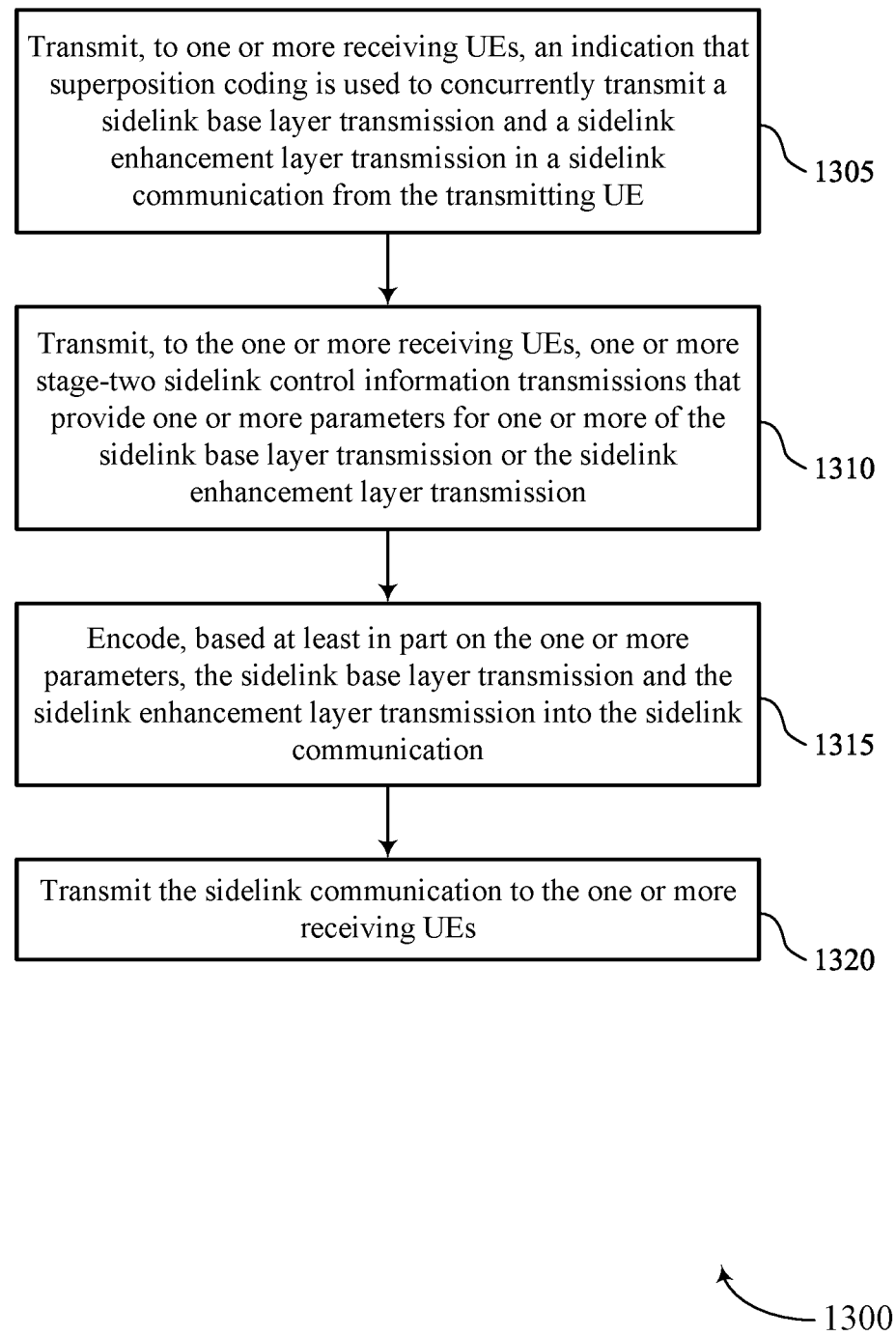

FIG. 13 shows a flowchart illustrating a method 1300 that supports superposition transmission techniques in sidelink communications in accordance with aspects of the present disclosure. The operations of the method 1300 may be implemented by a transmitting UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include transmitting, to one or more receiving UEs, an indication that superposition coding is used to concurrently transmit a sidelink base layer transmission and a sidelink enhancement layer transmission in a sidelink communication from the transmitting UE. The operations of 1305 may be performed in accordance with examples as disclosed herein. In some examples, aspects of the operations of 1305 may be performed by a sidelink communications manager 925 as described with reference to FIG. 9.

At 1310, the method may include transmitting, to the one or more receiving UEs, one or more stage-two sidelink control information transmissions that provide one or more parameters for one or more of the sidelink base layer transmission or the sidelink enhancement layer transmission. The operations of 1310 may be performed in accordance with examples as disclosed herein. In some examples, aspects of the operations of 1310 may be performed by an SCI manager 930 as described with reference to FIG. 9.

At 1315, the method may include encoding, based on the one or more parameters, the sidelink base layer transmission and the sidelink enhancement layer transmission into the sidelink communication. The operations of 1315 may be performed in accordance with examples as disclosed herein. In some examples, aspects of the operations of 1315 may be performed by an MUST manager 935 as described with reference to FIG. 9.

At 1320, the method may include transmitting the sidelink communication to the one or more receiving UEs. The operations of 1320 may be performed in accordance with examples as disclosed herein. In some examples, aspects of the operations of 1320 may be performed by a sidelink communications manager 925 as described with reference to FIG. 9.

Figure 14:
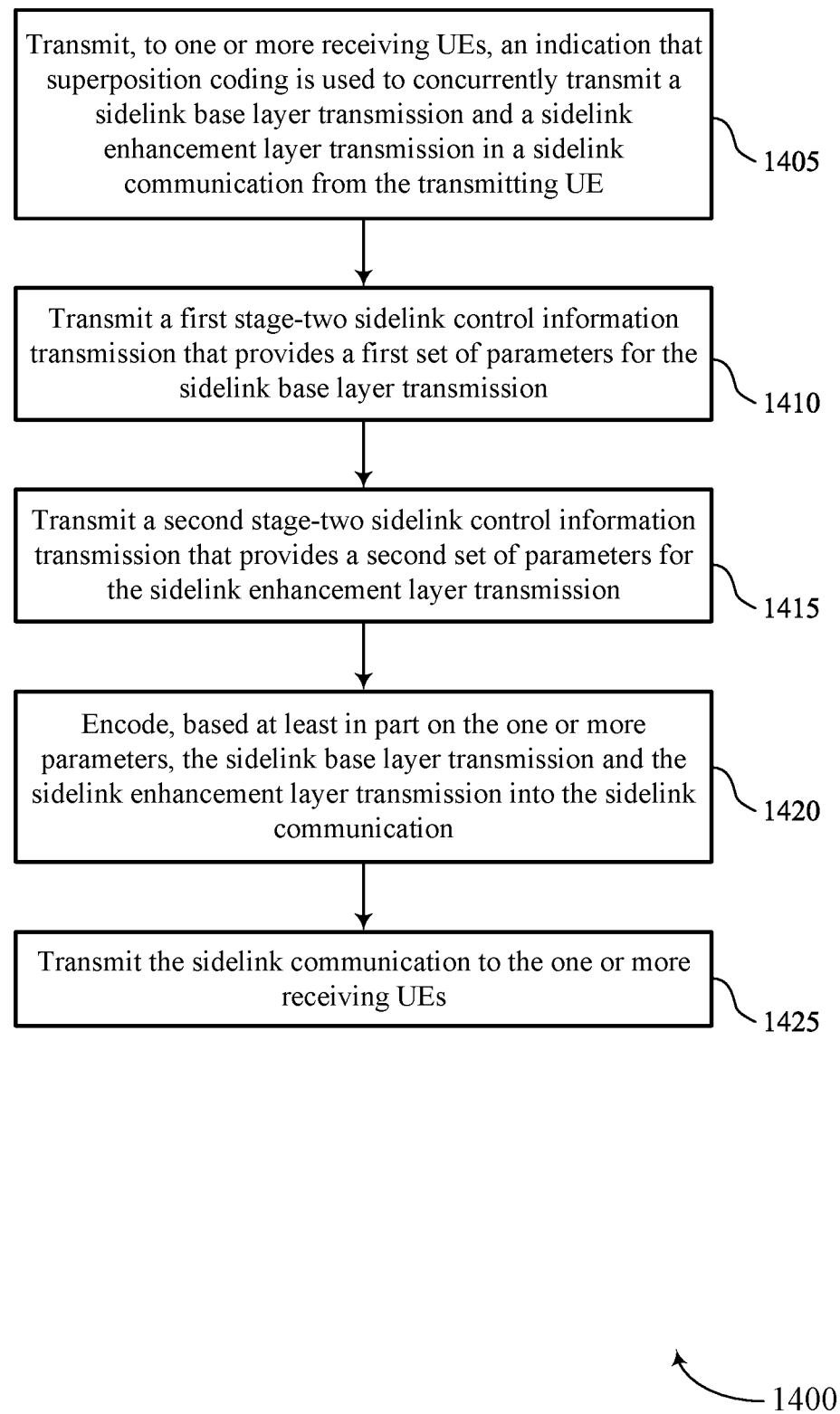

FIG. 14 shows a flowchart illustrating a method 1400 that supports superposition transmission techniques in sidelink communications in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include transmitting, to one or more receiving UEs, an indication that superposition coding is used to concurrently transmit a sidelink base layer transmission and a sidelink enhancement layer transmission in a sidelink communication from the transmitting UE. The operations of 1405 may be performed in accordance with examples as disclosed herein. In some examples, aspects of the operations of 1405 may be performed by a sidelink communications manager 925 as described with reference to FIG. 9.

At 1410, the method may include transmitting a first stage-two sidelink control information transmission that provides a first set of parameters for the sidelink base layer transmission. The operations of 1410 may be performed in accordance with examples as disclosed herein. In some examples, aspects of the operations of 1410 may be performed by an SCI manager 930 as described with reference to FIG. 9.

At 1415, the method may include transmitting a second stage-two sidelink control information transmission that provides a second set of parameters for the sidelink enhancement layer transmission. The operations of 1415 may be performed in accordance with examples as disclosed herein. In some examples, aspects of the operations of 1415 may be performed by an SCI manager 930 as described with reference to FIG. 9.

At 1420, the method may include encoding, based on the one or more parameters, the sidelink base layer transmission and the sidelink enhancement layer transmission into the sidelink communication. The operations of 1420 may be performed in accordance with examples as disclosed herein.

In some examples, aspects of the operations of 1420 may be performed by an MUST manager 935 as described with reference to FIG. 9.

At 1425, the method may include transmitting the sidelink communication to the one or more receiving UEs. The operations of 1425 may be performed in accordance with examples as disclosed herein. In some examples, aspects of the operations of 1425 may be performed by a sidelink communications manager 925 as described with reference to FIG. 9.

Figure 15:
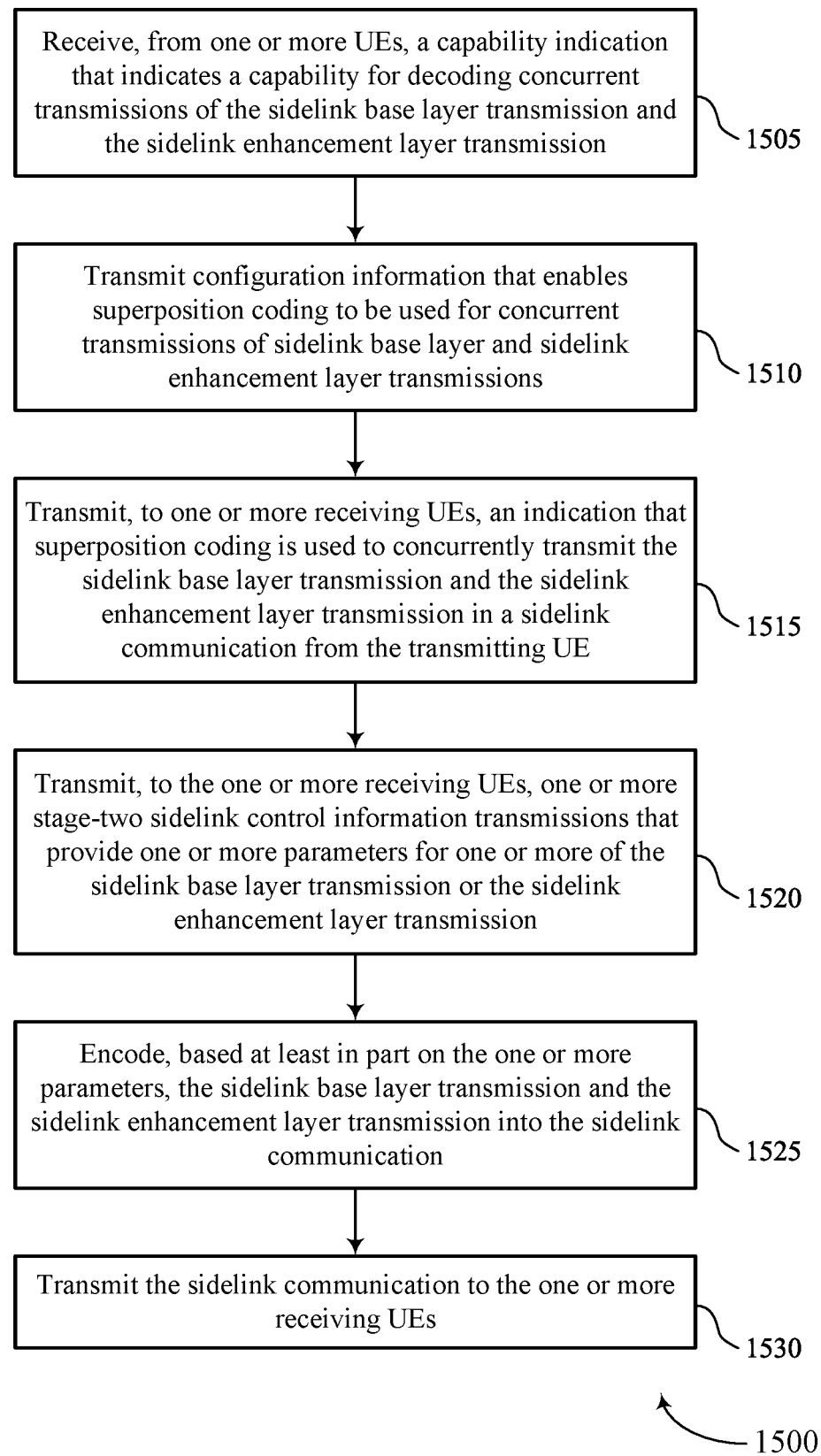

FIG. 15 shows a flowchart illustrating a method 1500 that supports superposition transmission techniques in sidelink communications in accordance with aspects of the present disclosure. The operations of the method 1500 may be implemented by a transmitting UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from one or more UEs, a capability indication that indicates a capability for decoding concurrent transmissions of the sidelink base layer transmission and the sidelink enhancement layer transmission. The operations of 1505 may be performed in accordance with examples as disclosed herein. In some examples, aspects of the operations of 1505 may be performed by a capability manager 945 as described with reference to FIG. 9.

At 1510, the method may include transmitting configuration information that enables superposition coding to be used for concurrent transmissions of sidelink base layer and enhancement layer transmissions. The operations of 1510 may be performed in accordance with examples as disclosed herein. In some examples, aspects of the operations of 1510 may be performed by a configuration manager 940 as described with reference to FIG. 9.

At 1515, the method may include transmitting, to one or more receiving UEs, an indication that superposition coding is used to concurrently transmit the sidelink base layer transmission and the sidelink enhancement layer transmission in a sidelink communication from the transmitting UE. The operations of 1515 may be performed in accordance with examples as disclosed herein. In some examples, aspects of the operations of 1515 may be performed by a sidelink communications manager 925 as described with reference to FIG. 9.

At 1520, the method may include transmitting, to the one or more receiving UEs, one or more stage-two sidelink control information transmissions that provide one or more parameters for one or more of the sidelink base layer transmission or the sidelink enhancement layer transmission. The operations of 1520 may be performed in accordance with examples as disclosed herein. In some examples, aspects of the operations of 1520 may be performed by an SCI manager 930 as described with reference to FIG. 9.

At 1525, the method may include encoding, based on the one or more parameters, the sidelink base layer transmission and the sidelink enhancement layer transmission into the sidelink communication. The operations of 1525 may be performed in accordance with examples as disclosed herein. In some examples, aspects of the operations of 1525 may be performed by an MUST manager 935 as described with reference to FIG. 9.

At 1530, the method may include transmitting the sidelink communication to the one or more receiving UEs. The operations of 1530 may be performed in accordance with examples as disclosed herein. In some examples, aspects of the operations of 1530 may be performed by a sidelink communications manager 925 as described with reference to FIG. 9.

The following provides an overview of aspects of the present disclosure:

Aspect 1: A method for wireless communications at a first UE, comprising: receiving, from a transmitting UE, an indication that superposition coding is used to concurrently transmit a sidelink base layer transmission and a sidelink enhancement layer transmission in a sidelink communication from the transmitting UE; receiving, based at least in part on the indication, one or more stage-two sidelink control information transmissions that provide one or more parameters for one or more of the sidelink base layer transmission or the sidelink enhancement layer transmission; and decoding, based at least in part on the one or more parameters, one or more of the sidelink base layer transmission or the sidelink enhancement layer transmission.

Aspect 2: The method of aspect 1, wherein the indication that superposition coding is used to concurrently transmit the sidelink base layer transmission and the sidelink enhancement layer transmission is received in a stage-one sidelink control information transmission.

Aspect 3: The method of any of aspects 1 through 2, wherein the decoding comprises: decoding both the sidelink base layer transmission and the sidelink enhancement layer transmission.

Aspect 4: The method of aspect 3, wherein the sidelink base layer transmission includes broadcast or groupcast information that is transmitted multiple receiving UEs, and the sidelink enhancement layer transmission includes unicast information that is transmitted to the first UE from the transmitting UE.

Aspect 5: The method of any of aspects 1 through 4, wherein the receiving the one or more stage-two sidelink control information transmissions comprises: receiving, based at least in part on a stage-one sidelink control information transmission, a first stage-two sidelink control information transmission that provides a first set of parameters for the sidelink base layer transmission; and receiving, based at least in part on the indication in the stage-one sidelink control information transmission, a second stage-two sidelink control information transmission that provides a second set of parameters for the sidelink enhancement layer transmission.

Aspect 6: The method of aspect 5, wherein the decoding comprises: decoding the sidelink base layer transmission based at least in part on the first set of parameters in the first stage-two sidelink control information transmission; and decoding the sidelink enhancement layer transmission based at least in part on the second set of parameters in the second stage-two sidelink control information transmission.

Aspect 7: The method of any of aspects 5 through 6, wherein the second stage-two sidelink control information transmission is transmitted as a medium access control (MAC) control element (CE) associated with a transport block that is decoded based at least in part on the first stage-two sidelink control information transmission.

Aspect 8: The method of any of aspects 5 through 7, wherein the first stage-two sidelink control information transmission has a first format, and the second stage-two sidelink control information transmission has a second format that is different than the first format.

Aspect 9: The method of any of aspects 1 through 8, wherein a stage-one sidelink control information transmission includes one or more bits that indicate that superposition coding is being used to concurrently transmit the sidelink base layer transmission and the sidelink enhancement layer transmission in the sidelink communication from the transmitting UE.

Aspect 10: The method of any of aspects 1 through 9, wherein the one or more stage-two sidelink control information transmissions include a first stage-two sidelink control information transmission and a second stage-two sidelink control information transmission that are concurrently transmitted in a same set of sidelink control information resources using superposition coding.

Aspect 11: The method of any of aspects 1 through 4, wherein the one or more stage-two sidelink control information transmissions include a single stage-two sidelink control information transmission that provides both a first set of parameters for the sidelink base layer transmission and a second set of parameters for the sidelink enhancement layer transmission.

Aspect 12: The method of any of aspects 1 through 11, further comprising: receiving, from the transmitting UE or from a serving base station, configuration information that enables superposition coding to be used for concurrent transmissions of the sidelink base layer transmission and the sidelink enhancement layer transmission.

Aspect 13: The method of aspect 12, further comprising: transmitting, to the transmitting UE or to the serving base station, a capability indication that indicates that the first UE has a capability for decoding concurrent transmissions of the sidelink base layer transmission and the sidelink enhancement layer transmission.

Aspect 14: A method for wireless communications at a transmitting UE, comprising: transmitting, to one or more receiving UEs, an indication that superposition coding is used to concurrently transmit a sidelink base layer transmission and a sidelink enhancement layer transmission in a sidelink communication from the transmitting UE; transmitting, to the one or more receiving UEs, one or more stage-two sidelink control information transmissions that provide one or more parameters for one or more of the sidelink base layer transmission or the sidelink enhancement layer transmission; encoding, based at least in part on the one or more parameters, the sidelink base layer transmission and the sidelink enhancement layer transmission into the sidelink communication; and transmitting the sidelink communication to the one or more receiving UEs.

Aspect 15: The method of aspect 14, wherein the indication that superposition coding is used to concurrently transmit the sidelink base layer transmission and the sidelink enhancement layer transmission is transmitted in a stage-one sidelink control information transmission.

Aspect 16: The method of any of aspects 14 through 15, wherein both the sidelink base layer transmission and the sidelink enhancement layer transmission are transmitted to a first UE for decoding at the first UE.

Aspect 17: The method of aspect 16, wherein the sidelink base layer transmission includes broadcast or groupcast information that is transmitted to multiple receiving UEs, and the sidelink enhancement layer transmission includes unicast information that is transmitted to only the first UE.

Aspect 18: The method of any of aspects 14 through 17, wherein the transmitting the one or more stage-two sidelink control information transmissions comprises: transmitting a first stage-two sidelink control information transmission that provides a first set of parameters for the sidelink base layer transmission; and transmitting a second stage-two sidelink control information transmission that provides a second set of parameters for the sidelink enhancement layer transmission.

Aspect 19: The method of aspect 18, wherein the second stage-two sidelink control information transmission is transmitted as a medium access control (MAC) control element (CE) associated with a first transport block of the sidelink base layer transmission, that is decoded based at least in part on the first stage-two sidelink control information transmission.

Aspect 20: The method of any of aspects 14 through 19, wherein a stage-one sidelink control information transmission includes one or more bits that indicate that superposition coding is being used to concurrently transmit the sidelink base layer transmission and the sidelink enhancement layer transmission in the sidelink communication from the transmitting UE.

Aspect 21: The method of any of aspects 14 through 20, wherein the one or more stage-two sidelink control information transmissions include a first stage-two sidelink control information transmission and a second stage-two sidelink control information transmission that are concurrently transmitted in a same set of sidelink control information resources using superposition coding.

Aspect 22: The method of any of aspects 14 through 17, wherein the one or more stage-two sidelink control information transmissions include a single stage-two sidelink control information transmission that provides both a first set of parameters for the sidelink base layer transmission and a second set of parameters for the sidelink enhancement layer transmission.

Aspect 23: The method of any of aspects 14 through 22, further comprising: transmitting configuration information that enables superposition coding to be used for concurrent transmissions of the sidelink base layer transmission and the sidelink enhancement layer transmission.

Aspect 24: The method of any of aspects 14 through 23, further comprising: receiving, from one or more UEs, a capability indication that indicates that a capability for decoding concurrent transmissions of the sidelink base layer transmission and the sidelink enhancement layer transmission.

Aspect 25: An apparatus for wireless communications at a first UE, comprising a processor; memory coupled with the processor; and instructions stored in the memory and executable by the processor to cause the apparatus to perform a method of any of aspects 1 through 13.

Aspect 26: An apparatus for wireless communications at a first UE, comprising at least one means for performing a method of any of aspects 1 through 13.

Aspect 27: A non-transitory computer-readable medium storing code for wireless communications at a first UE, the code comprising instructions executable by a processor to perform a method of any of aspects 1 through 13.

Aspect 28: An apparatus for wireless communications at a transmitting UE, comprising a processor; memory coupled with the processor; and instructions stored in the memory and executable by the processor to cause the apparatus to perform a method of any of aspects 14 through 24.

Aspect 29: An apparatus for wireless communications at a transmitting UE, comprising at least one means for performing a method of any of aspects 14 through 24.

Aspect 30: A non-transitory computer-readable medium storing code for wireless communications at a transmitting UE, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   receiving, from a transmitting UE, an indication that superposition coding is used to concurrently transmit a sidelink base layer transmission and a sidelink enhancement layer transmission in a sidelink communication from the transmitting UE;
   receiving, based at least in part on the indication, one or more stage-two sidelink control information transmissions that provide one or more parameters for one or more of the sidelink base layer transmission or the sidelink enhancement layer transmission; and
   decoding, based at least in part on the one or more parameters, one or more of the sidelink base layer transmission or the sidelink enhancement layer transmission.

2. The method of claim 1, wherein the indication that superposition coding is used to concurrently transmit the sidelink base layer transmission and the sidelink enhancement layer transmission is received in a stage-one sidelink control information transmission.

3. The method of claim 1, wherein the decoding comprises:
   decoding both the sidelink base layer transmission and the sidelink enhancement layer transmission.

4. The method of claim 3, wherein the sidelink base layer transmission includes broadcast or groupcast information that is transmitted multiple receiving UEs, and the sidelink enhancement layer transmission includes unicast information that is transmitted to the first UE from the transmitting UE.

5. The method of claim 1, wherein the receiving the one or more stage-two sidelink control information transmissions comprises:
   receiving, based at least in part on a stage-one sidelink control information transmission, a first stage-two sidelink control information transmission that provides a first set of parameters for the sidelink base layer transmission; and
   receiving, based at least in part on the indication in the stage-one sidelink control information transmission, a second stage-two sidelink control information transmission that provides a second set of parameters for the sidelink enhancement layer transmission.

6. The method of claim 5, wherein the decoding comprises:
   decoding the sidelink base layer transmission based at least in part on the first set of parameters in the first stage-two sidelink control information transmission; and
   decoding the sidelink enhancement layer transmission based at least in part on the second set of parameters in the second stage-two sidelink control information transmission.

7. The method of claim 5, wherein the second stage-two sidelink control information transmission is transmitted as a medium access control (MAC) control element (CE) associated with a transport block that is decoded based at least in part on the first stage-two sidelink control information transmission.

8. The method of claim 5, wherein the first stage-two sidelink control information transmission has a first format, and the second stage-two sidelink control information transmission has a second format that is different than the first format.

9. The method of claim 1, wherein a stage-one sidelink control information transmission includes one or more bits that indicate that superposition coding is being used to concurrently transmit the sidelink base layer transmission and the sidelink enhancement layer transmission in the sidelink communication from the transmitting UE.

10. The method of claim 1, wherein the one or more stage-two sidelink control information transmissions include a first stage-two sidelink control information transmission and a second stage-two sidelink control information transmission that are concurrently transmitted in a same set of sidelink control information resources using superposition coding.

11. The method of claim 1, wherein the one or more stage-two sidelink control information transmissions include a single stage-two sidelink control information transmission that provides both a first set of parameters for the sidelink base layer transmission and a second set of parameters for the sidelink enhancement layer transmission.

12. The method of claim 1, further comprising:
receiving, from the transmitting UE or from a serving base station, configuration information that enables superposition coding to be used for concurrent transmissions of the sidelink base layer transmission and the sidelink enhancement layer transmission.

13. The method of claim 12, further comprising:
transmitting, to the transmitting UE or to the serving base station, a capability indication that indicates that the first UE has a capability for decoding concurrent transmissions of the sidelink base layer transmission and the sidelink enhancement layer transmission.

14. A method for wireless communications at a transmitting user equipment (UE), comprising:
transmitting, to one or more receiving UEs, an indication that superposition coding is used to concurrently transmit a sidelink base layer transmission and a sidelink enhancement layer transmission in a sidelink communication from the transmitting UE;
transmitting, to the one or more receiving UEs, one or more stage-two sidelink control information transmissions that provide one or more parameters for one or more of the sidelink base layer transmission or the sidelink enhancement layer transmission;
encoding, based at least in part on the one or more parameters, the sidelink base layer transmission and the sidelink enhancement layer transmission into the sidelink communication; and
transmitting the sidelink communication to the one or more receiving UEs.

15. The method of claim 14, wherein the indication that superposition coding is used to concurrently transmit the sidelink base layer transmission and the sidelink enhancement layer transmission is transmitted in a stage-one sidelink control information transmission.

16. The method of claim 14, wherein both the sidelink base layer transmission and the sidelink enhancement layer transmission are transmitted to a first UE for decoding at the first UE.

17. The method of claim 16, wherein the sidelink base layer transmission includes broadcast or groupcast information that is transmitted to multiple receiving UEs, and the sidelink enhancement layer transmission includes unicast information that is transmitted to only the first UE.

18. The method of claim 14, wherein the transmitting the one or more stage-two sidelink control information transmissions comprises:
transmitting a first stage-two sidelink control information transmission that provides a first set of parameters for the sidelink base layer transmission; and
transmitting a second stage-two sidelink control information transmission that provides a second set of parameters for the sidelink enhancement layer transmission.

19. The method of claim 18, wherein the second stage-two sidelink control information transmission is transmitted as a medium access control (MAC) control element (CE) associated with a first transport block of the sidelink base layer transmission, that is decoded based at least in part on the first stage-two sidelink control information transmission.

20. The method of claim 14, wherein a stage-one sidelink control information transmission includes one or more bits that indicate that superposition coding is being used to concurrently transmit the sidelink base layer transmission and the sidelink enhancement layer transmission in the sidelink communication from the transmitting UE.

21. The method of claim 14, wherein the one or more stage-two sidelink control information transmissions include a first stage-two sidelink control information transmission and a second stage-two sidelink control information transmission that are concurrently transmitted in a same set of sidelink control information resources using superposition coding.

22. The method of claim 14, wherein the one or more stage-two sidelink control information transmissions include a single stage-two sidelink control information transmission that provides both a first set of parameters for the sidelink base layer transmission and a second set of parameters for the sidelink enhancement layer transmission.

23. The method of claim 14, further comprising:
transmitting configuration information that enables superposition coding to be used for concurrent transmissions of the sidelink base layer transmission and the sidelink enhancement layer transmission.

24. The method of claim 14, further comprising:
receiving, from one or more UEs, a capability indication that indicates a capability for decoding concurrent transmissions of the sidelink base layer transmission and the sidelink enhancement layer transmission.

25. An apparatus for wireless communications at a first user equipment (UE), comprising:
a processor;
memory coupled with the processor, the memory and processor configured to:
receive, from a transmitting UE, an indication that superposition coding is used to concurrently transmit a sidelink base layer transmission and a sidelink enhancement layer transmission in a sidelink communication from the transmitting UE;
receive, based at least in part on the indication, one or more stage-two sidelink control information transmissions that provide one or more parameters for one or more of the sidelink base layer transmission or the sidelink enhancement layer transmission; and
decoding, base at least in part on the one or more parameters, one or more of the sidelink base layer transmission or the sidelink enhancement layer transmission.

26. The apparatus of claim 25, wherein the memory and processor are further configured to:
decode both the sidelink base layer transmission and the sidelink enhancement layer transmission, wherein the sidelink base layer transmission includes broadcast or groupcast information that is transmitted by the transmitting UE to multiple receiving UEs, and the sidelink enhancement layer transmission includes unicast information that is transmitted to the first UE from the transmitting UE.

27. The apparatus of claim 25, wherein the memory and processor are further configured to:
receive, based at least in part on a stage-one sidelink control information transmission, a first stage-two sidelink control information transmission that provides a first set of parameters for the sidelink base layer transmission; and
receive, based at least in part on the indication in the stage-one sidelink control information transmission, a second stage-two sidelink control information transmission that provides a second set of parameters for the sidelink enhancement layer transmission.

28. An apparatus for wireless communications at a transmitting user equipment (UE), comprising:
a processor;
memory coupled with the processor, the memory and processor configured to:
transmit, to one or more receiving UEs, an indication that superposition coding is used to concurrently transmit a sidelink base layer transmission and a sidelink enhancement layer transmission in a sidelink communication from the transmitting UE;
transmit, to the one or more receiving UEs, one or more stage-two sidelink control information transmissions that provide one or more parameters for one or more of the sidelink base layer transmission or the sidelink enhancement layer transmission;
encode, based at least in part on the one or more parameters, the sidelink base layer transmission and the sidelink enhancement layer transmission into the sidelink communication; and
transmit the sidelink communication to the one or more receiving UEs.

29. The apparatus of claim 28, wherein both the sidelink base layer transmission and the sidelink enhancement layer transmission are transmitted to a first UE for decoding at the first UE, and wherein the sidelink base layer transmission includes broadcast or groupcast information that is transmitted to multiple receiving UEs, and the sidelink enhancement layer transmission includes unicast information that is transmitted to only the first UE.

30. The apparatus of claim 28, wherein the memory and processor are further configured to:
transmit a first stage-two sidelink control information transmission that provides a first set of parameters for the sidelink base layer transmission; and
transmit a second stage-two sidelink control information transmission that provides a second set of parameters for the sidelink enhancement layer transmission.

* * * * *